US011962671B2

(12) United States Patent
Sarikaya et al.

(10) Patent No.: US 11,962,671 B2
(45) Date of Patent: Apr. 16, 2024

(54) BIOMIMETIC CODECS AND BIOMIMETIC CODING TECHNIQUES

(71) Applicant: University of Washington, Seattle, WA (US)

(72) Inventors: Mehmet Sarikaya, Seattle, WA (US); Burak Berk Ustundag, Seattle, WA (US)

(73) Assignee: University of Washington, Seattle, WA (US)

( * ) Notice: Subject to any disclaimer, the term of this patent is extended or adjusted under 35 U.S.C. 154(b) by 1199 days.

(21) Appl. No.: 16/610,417

(22) PCT Filed: May 3, 2018

(86) PCT No.: PCT/US2018/030973
§ 371 (c)(1),
(2) Date: Nov. 1, 2019

(87) PCT Pub. No.: WO2018/204708
PCT Pub. Date: Nov. 8, 2018

(65) Prior Publication Data
US 2021/0168223 A1 Jun. 3, 2021

Related U.S. Application Data

(60) Provisional application No. 62/500,670, filed on May 3, 2017.

(51) Int. Cl.
*G06N 20/00* (2019.01)
*G06F 17/15* (2006.01)
(Continued)

(52) U.S. Cl.
CPC .............. *H04L 69/04* (2013.01); *G06F 17/15* (2013.01); *G06F 17/17* (2013.01); *G06N 20/00* (2019.01);
(Continued)

(58) Field of Classification Search
CPC ......... H04L 69/04; G06N 20/00; G10L 19/02; G10L 25/30; H04N 19/42
See application file for complete search history.

(56) References Cited

U.S. PATENT DOCUMENTS 5,355,435 A * 10/1994 DeYong ............. H03H 17/0223
706/26
5,864,835 A * 1/1999 Gorelik ............... H01L 29/7881
257/E29.302

(Continued)

FOREIGN PATENT DOCUMENTS

CN          101183873 B       9/2011

OTHER PUBLICATIONS

Shin JH. Novel impulse neural circuits for pulsed neural network. InProceedings of 1993 International Conference on Neural Networks (IJCNN-93-Nagoya, Japan) Oct. 25, 1993 (vol. 3, pp. 3017-3022). IEEE. (Year: 1993).*

(Continued)

*Primary Examiner* — Oluwatosin O Alabi
(74) *Attorney, Agent, or Firm* — Stoel Rives LLP

(57) ABSTRACT

Examples of biomimetic codecs and biomimetic coding techniques are described herein. Morphologically-adaptive coding networks can be developed in accordance with energy dissipation driven "heat" generated by application of training data. The morphologically-adaptive coding networks may be representative of common features expected in an input signal or data stream. Decoding may proceed using the morphologically-adaptive coding network. Morphologically-adaptive coding networks may be used as a cortex that can be shared for boosting multimedia data compression rates and/or increasing the encode-decode fidelity of information content while the features remain queryable in encoded form. Examples of the biomimetic codecs and biomimetic coding techniques provide a broad- (Continued)

based technology platform that can be used in context-IDed multimedia storage, pattern recognition, and high-performance computing/big data management, the hallmarks of web- and cloud-based systems.

24 Claims, 16 Drawing Sheets

(51) Int. Cl.
*G06F 17/17* (2006.01)
*H04B 1/66* (2006.01)
*H04L 69/04* (2022.01)
*G10L 19/02* (2013.01)
*G10L 25/30* (2013.01)
*H04N 19/42* (2014.01)

(52) U.S. Cl.
CPC ............... *H04B 1/66* (2013.01); *G10L 19/02* (2013.01); *G10L 25/30* (2013.01); *H04N 19/42* (2014.11)

(56) References Cited

U.S. PATENT DOCUMENTS

| | | | |
|---|---|---|---|
| 6,832,251 B1 | 12/2004 | Gelvin et al. | |
| 7,324,979 B2 | 1/2008 | Butler et al. | |
| 9,183,493 B2 | 11/2015 | Richert et al. | |
| 9,443,192 B1 | 9/2016 | Cosic | |
| 2003/0179941 A1* | 9/2003 | DeCegama | H04N 19/70 375/E7.044 |
| 2004/0010480 A1 | 1/2004 | Agnihotri et al. | |
| 2005/0033377 A1* | 2/2005 | Milojevic | A61N 1/36038 607/45 |
| 2008/0027651 A1* | 1/2008 | Siekmeier | G16C 20/70 702/19 |
| 2011/0016071 A1* | 1/2011 | Guillen | G06N 3/10 706/15 |
| 2011/0137843 A1* | 6/2011 | Poon | G06N 3/088 706/33 |
| 2013/0318020 A1* | 11/2013 | Shapero | G06N 3/044 706/30 |
| 2015/0254553 A1* | 9/2015 | Arsovski | G06N 3/08 706/25 |
| 2018/0075345 A1* | 3/2018 | Gottfried | G06N 3/049 |
| 2018/0302807 A1* | 10/2018 | Chen | H04L 41/12 |
| 2021/0097389 A1* | 4/2021 | Kiranyaz | G06N 3/084 |

OTHER PUBLICATIONS

Indiveri G, Linares-Barranco B, Hamilton TJ, Van Schaik A, Etienne-Cummings R, Delbruck T, Liu SC, Dudek P, Häfliger P, Renaud S, Schemmel J. Neuromorphic silicon neuron circuits. Frontiers in neuroscience. May 31, 2011;5:9202. (Year: 2011).*

Basheer, et al., Artificial Neural Networks: Fundamentals, Computing, Design, and Application, Journal of Microbiological Methods, Dec. 2000.

Krogh, , What Are Artificial Neural Networks?, Nature Biotechnology, vol. 26, No. 2, Feb. 2008.

Pastur-Romay, et al., Deep Artificial Neural Networks and Neuromorphic Chips for Big Data Analysis: Pharmaceutical and Bioinformatics Applications, International Journal of Molecular Sciences, Aug. 2016.

Puthooran, et al., Lossless Compression of Medical Images Using a Dual Level DPCM With Context Adaptive Switching Neural Network Predictor, Sep. 2012.

Risi, et al., An Enhanced Hypercube-Based Encoding for Evolving the Placement, Density, and Connectivity of Neurons, Artificial Life, vol. 18, No. 4, Oct. 2012.

Wang, et al., Robustly Fitting and Forecasting Dynamical Data With Electromagnetically Coupled Artificial Neural Network: A Data Compression Method, IEEE Transactions on Neural Networks and Learning Systems, vol. 28, No. 6, Jun. 2017.

Weichwald, et al., Optimal Coding in Biological and Artificial Neural Networks, Cornell University Library, May 2016.

Widrow, et al., Neural Networks: Applications in Industry, Business and Science, Communications of the ACM, vol. 37, No. 3, Mar. 1994.

International Search Report and Written Opinion dated Jul. 19, 2018 for PCT Application No. PCT/US2018/030973, 15 pages.

* cited by examiner

BIOMIMETIC CODECS AND BIOMIMETIC CODING TECHNIQUES

CROSS-REFERENCE TO RELATED APPLICATIONS

This application is a 35 U.S.C. § 371 National Stage Application of PCT Application No. PCT/US2018/030973, filed May 3, 2018, which claims the benefit under 35 U.S.C. § 119 of the earlier filing date of U.S. Provisional Application Ser. No. 62/500,670 filed May 3, 2017, the entire contents of which are hereby incorporated by reference, in their entirety, for any purposes.

TECHNICAL FIELD

Examples described herein relating to encoding (e.g., compressing, abstracting, querying) data using biomimetic information codecs and/or biomimetic coding techniques.

BACKGROUND

Data encoding (e.g., compression) may be used to provide compressed data which is representative of a larger set of input data, and from which the input data can be recovered. Generally, the encoded (e.g., compressed) data has a smaller sure than the input data, and may be more efficiently transmitted and/or stored. Examples of existing encoded data formats include .mp3, .jpg and .mpeg.

Existing encoding techniques, however, such as JPEG encoding may provide encoded data which may not retain order or meaning in the compressed data stream. Rather, the compressed data stream may represent random data. In order to manipulate the compressed data, it may need to first be reconstructed into the raw data and then be further manipulated.

SUMMARY

Examples of methods are described herein. An example method may include providing input data, providing a morphologically-adaptive coding network comprising layers of nodes, the nodes each comprising a plurality of hillocks, connections between selected nodes being provided at selected hillocks, the connections based on energy dissipation with respect to spectral component variation of applied test data, and encoding the input data wing the morphologically-adaptive coding network to provide compressed data, the encoding comprising applying the input data to the morphologically-adaptive coding network to provide the compressed data comprising an identification or ending hillocks at last layers of the morphologically-adaptive coding network visited by the input data.

In some examples, the morphologically-adaptive coding network is trained to develop the layers of nodes by providing a next layer node at a selected hillock of a previous layer node, the selected hillock having stimulation rates above a threshold using a set of training data.

In some examples, the nodes each have an associated time constant, and wherein the next layer node has a smaller time constant than the previous layer node.

In some examples, applying the input data to the morphologically-adaptive coding network comprises applying a convolutional function to the input data.

In some examples, the convolutional function comprises a wavelet transform.

In some examples, ending nodes of the morphologically-adaptive coding network have an equal probabilistic frequency distribution.

In some examples, the compressed data is queryable.

In some examples, the compressed data further comprises an index of visited nodes of the morphologically-adaptive coding network.

In some examples, the input data comprises a type of data selected from audio (1D), image (2D), video (3D), other sensory patterns (xD) data, or combinations thereof. In some examples, the morphologically-adaptive coding network is specific to the type of data.

In some examples, the morphologically-adaptive coding network comprises a first morphologically-adaptive coding network, and the method further includes encoding the compressed data using a second morphologically-adaptive coding network.

In some examples, the method further includes decoding the compressed data using the morphologically-adaptive coding network to recover an approximation of the input data.

In some examples, the method further includes filtering the input data applied to the morphologically-adaptive coding network using a low pass filter.

Examples of devices are described herein. An example device may include at least one processor, electronic storage encoded with a morphologically-adaptive coding network comprising layers of nodes, the nodes etch comprising a plurality of hillocks, connections between selected nodes being provided at selected hillocks, the connections based on energy dissipation with respect to spectral component variation of applied test data, and at least one non-transitory computer readable medium encoded with instructions which, when executed, cause the device to perform actions comprising receive encoded input data comprising an identification of ending hillocks at last layers of the morphologically-adaptive coding network visited by input data, and decode the encoded input data using the morphologically-adaptive coding network.

In some examples, the input data comprises audio data, and the device comprises a speaker. The instructions may further include instructions to cause the device to play the input data using the speaker after said decode action.

In some examples, the input data may include image data, the device may include a display, and the instructions may include instructions to cause the device to display the input data after said decode.

In some examples, the input data may include video data, the device may include a display, and the instructions may further include instructions to cause the device to display the video data after said decode.

In some examples, the morphologically-adaptive coding network comprises a first morphologically-adaptive coding network, and the electronic storage is configured to store a plurality of morphologically-adaptive coding networks, the instructions further including instructions which, when executed, cause the device to select the first morphologically-adaptive coding network for use based on a context of the input data.

In some examples, the decode action comprises performing a mathematical inverse of operations specified by the morphologically-adaptive coding network.

In some examples, the decode action comprises feedforward mimicking.

BRIEF DESCRIPTION OF THE DRAWINGS

FIG. 13 is a schematic illustration of nodes of a morphologically-adaptive coding network arranged in accordance with examples described herein.

DETAILED DESCRIPTION

Figure 1:
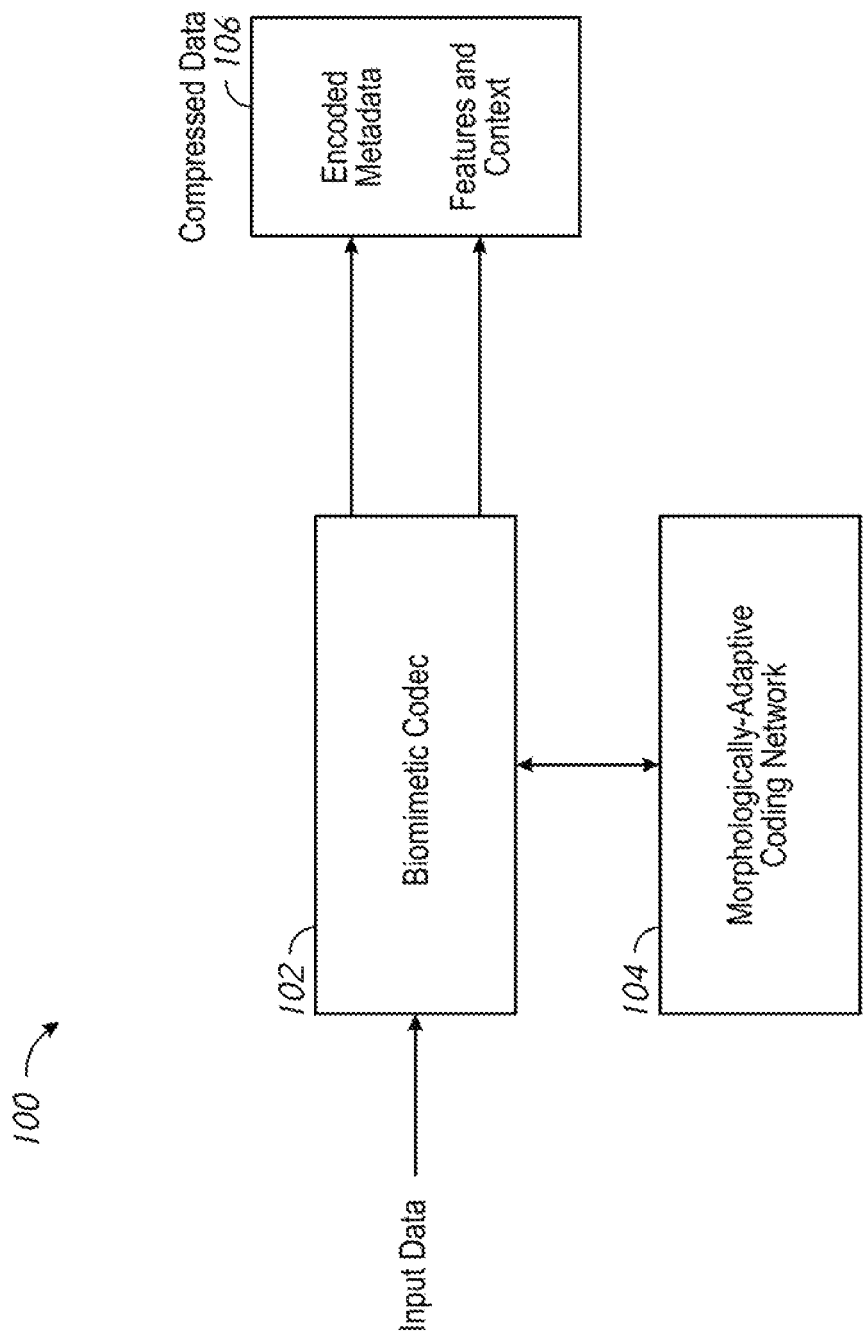
FIG. 1 is a schematic illustration of a system arranged in accordance with examples described herein.

Certain details are set forth herein to provide an understanding of described embodiments of technology. However, other examples may be practiced without various of these particular details. In some instances, well-known circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented here.

Examples of biomimetic codecs and biomimetic coding techniques are described herein. Morphologically-adaptive coding networks can be developed in accordance with energy dissipation driven "beat" generated by application of training data. The morphologically-adaptive coding networks may be representative of common features expected in an input signal or data stream. Decoding may proceed using the morphologically-adaptive coding network. Morphologically-adaptive coding networks may be used as a cortex that can be shared for boosting multimedia data compression rates and/or increasing the encode-decode fidelity of information content while the features remain queryable in encoded form. A biomimetic codec utilizing biomimetic coding cortices may facilitate cognitive functions for recovery or regeneration of information as well as decision making, which may be key qualities for the development of information systems, cloud computing, internet of things and artificial intelligence. Furthermore, examples of the biomimetic codecs and biomimetic coding techniques provide a broad-based technology platform which can be used in context-IDed multimedia storage, pattern recognition, and high-performance computing, including big data management, the hallmarks of web- and cloud-based systems.

Encoding and decoding of input data, such as audio, visual, text, tactile or any kind of data relating to perceptible information is desirable for storage and transmission to make efficient use of memory storage and limited physical communication bandwidth. Examples described herein utilize structures (e.g., morphologically-adaptive coding networks) that may be related to the nature of the data being encoded. The morphologically-adaptive coding networks described herein aim to provide a biomimetic engineering solution for encoding and decoding. A resulting compressed data stream (which may be referred to as a BIC format) may allow for efficient encoding and may itself retain sufficient structure, which may be further manipulated, even in the compressed form. The presently offered approach stands in contrast with existing audio or visual data encoding or compression methods where playback or content analysis requires decoding or decompressing the data and in the process compromising the quality of the data. For example, if further processing is desired on JPEG encoded image data (e.g., to count the number of people in an image), the image would need to first be decoded into raw bitmap form. Instead, examples described herein provide compressed data having a feature-based structure that may depend on probabilistically applied patterns of data during training. Accordingly, the compressed data itself may be manipulated. Further, the data quality is preserved, hi some examples, systems of encoding devices are provided herein to further provide bioengineered solutions, where an encoding device (e.g., a "cortex") may be provided for each of a plurality of types of sensory input (e.g., an audio cortex, a visual cortex, a tactile cortex). Each cortex may utilize a morphologically-adaptive coding network trained for foe associated type of input.

Accordingly, examples described hereto may provide an adaptive data processing template-based encoding/decoding methodology which may be referred to as .bic, biomimetic information coda. Data may be processed in real-time using a template (e.g., a morphologically-adaptive coding network) which may change over time. The change of the template may be slow relative to the rate of incoming data and the rate of encoding. Multiple templates may be used to provide a hierarchically formed network structure. Accordingly, examples described herein may facilitate keeping time and frequency domain components of the data relational and components are hierarchically cascadable, therefore, providing highly efficient and queryable data encoding and decoding in some examples.

Examples described herein may take inspiration from biological networks. Some aspects of biological networks are described to facilitate an appreciation of components described herein, h is to be understood foal the examples described herein utilize engineered and/or semiconductor computerized implementations of coding networks. Mechanisms used in biology may be used as inspiration, but may not be exactly replicated in computational solutions described herein. Depending on their functions, there are different sizes of neurons and sensory organs of the periphery system in the cerebral cortex of humans that are connected to various regions of sub-neural networks. When the distance between the relevant preprocessing part and the sensor location is huge, the cut-off frequency of the bandwidth may be less and the time constant of the neuron may be high. Conversely, smaller and intensive neurons are connected through shorter lines for higher bandwidth requirements such as in the case of eyes and the human biological visual cortex. In a biological neuron, each of the dendrites may be capable of discriminating different signal sequences. The same task can only be achieved by a network consisting of multiple neurons in existing conventional artificial neural network (ANN) approaches. In biological neural networks, there may be an energy-entropy related physical relationship in which the energy is minimized while the entropy, e.g., information content, is maximized. For example, when a new type of data pattern is applied, energy dissipation may be increased doe to spectral divergence, and a network may be established that minimizes total energy dissipation. Hence the network may be considered to provide a coding that increases not only the physical entropy but also the entropy defined for information. These events create a condition in which the intelligent being, coordinates itself with respect to the probabilistic events taking place within its environment and the relevant signal patterns that it receives using its sensory mechanisms. Biomimetic codecs described herein may utilize these three major ubiquitous properties of intelligent systems in nature. Firstly, biomimetic codecs described herein may process signal patterns over an adaptive template (e.g., a morphologically-adaptive coding network). The network is constructed with respect to a criteria on energy dissipation (e.g., minimum energy dissipation) and a criteria on spectral transfer (e.g., maximum spectral transfer) within a chosen time frame. Time frames may be randomly initiated for different frequency intervals in a parallel structure as an analogy to regional distribution of different sires of neuron groups differing randomly from each other. Nodes of morphologically-adaptive coding networks described herein may implement functions in a variety of ways. The characteristics of the nodes may be different from existing convolutional neural networks (CNN) as well as conventional artificial neural networks (ANN). CNN, ANN, and similar conventional systems generally use network relationships (e.g., connection of nodes and weights) described in fixed-sized memory matrix. For this reason, non-existing or negligibly small-weighted connections occupy unused or inessential memory space, thereby reducing the efficiency of these systems. The conventional systems, therefore, cannot evolve outside the prescribed definition of the fixed matrices. In examples of morphologically-adaptive coding networks described herein, the tree structure (e.g., hierarchical network structure) may be entirely independent and constructed freely in various directions, and which the changes in the network evolve depending oil applied signal patterns and their probabilities. This may be inspired, for example, by observation of pyramidal neural cells which are groups of deep series of neurons while the biological cerebral cortex is a wide-spread network including complex and dense neural connections. When a new type of information is received repetitively, first it increases the temperature of the region of the brain that perceives it. Then, the network may undergo a structural modification that is facilitated by the adaptation of the network to the time-dependent spectral variations of the signal patterns. Biomimetic coding described herein may operate using analogous principles. Examples of morphologically-adaptive coding networks described herein may be developed and/or adjusted to minimize energy dissipation (e.g., as measured by computational comparisons and/or differences) through the spectral distribution of the incoming signal patterns within different moving time frames. The described methodology may provide the most efficient compression while the decomposed signal components are associated through definitive context relations. This may impose an object-oriented coding with respect to probabilities of the applied signals. Hence biomimetic codecs described herein may provide data compression, classification, clustering and abstraction in relational organized form.

Encoding techniques described herein may be different from conventional data encoding methods in that the biomimetic encoding described herein may span over tree leaves (e.g., nodes in a morphologically-adaptive coding network) that are related to change of sensory input in a rolling time window. Those leaves include relational information to the origin similarity of the signal. Variation of the leaf numbers as record of longer term signal pattern has higher entropy. Variation of leaf numbers can be sequenced and re-encoded depending on type of transformation in each internal node. A typical transformation that may be used by nodes may be inspired by the manner in which human brains develop networks. The nodes may utilize an energy-entropy relationship. Probabilistic distribution of input signal (e.g., input data) patterns in lime may cause stimulation of nodes in a morphologically-adoptive coding network described herein, which may result in development of the network in a manner which may mimic (e.g., match) the physical sensitivity and the bandwidth of the type of input signal. Perceptual coding of these signals may be performed in a convolutional manner.

Taking inspiration from biology, convolutional matching rate of a signal to a specific part of the brain may cause an increase of beat due to dissipation and/or conductance. Accordingly, in examples of morphologically-adaptive coding networks described herein, the convolutional matching rate of a received pattern in several parallel nodes may be proportional to their previous acceptance by each of them. Considering the nodes as parallel impedances, the lowest resisting and/or highest conducting node may receive a higher share of the energy. Internally this energy may be considered in parts as dissipation and conductance. The dissipated part of the energy may be proportional to foe convolutional dissimilarity of the absorbed signal pattern. For example, a difference between foe signal pattern and the node may be considered to cause 'heat' at the node (when operating in biology, this may be a physical heating of biological neurons). The heat prompts hillocks of foe nodes to develop different directions in order to form new connections between nodes that may reduce (e.g., minimize) energy loss if similar signal patterns are reapplied quicker than foe cooling lime. For example, the network may grow in a manner to reduce dissimilarity between the incoming and expected signals. Morphological adaptation may accordingly be performed in this manner. Growth of the closest hillock in foe gradient of foe vector field to the neighboring node facilitates building foe next morphological connection to reduce dissipated head and increase conducted energy. A convolutional similarity of the arrived pattern may determine foe energy to be transferred without loss. If foe repetition of the same signal pattern is higher, then nodes may increase conductivity through adaptation. When the probabilistic distribution is deviated as arrival of new context or information, foe morphologic ally-adaptive network may adapt and develop so that foe beat distribution related energy dissipation can be homogenized.

Examples described herein may utilize wavelet transformation as an example convolutional feature extraction method. Wavelet functions may be convolved with the input signal patterns. Wavelet coefficients may be evaluated as series of signal features in construction of morphologically-adaptive coding networks described. Further, convolution of one or more signal patterns from different cortices may be used m other layers for advanced functionality such as decision making and context-based coding.

In some examples, multiple biomimetic encoders may be connected in a cascaded manner (e.g., cascaded encoding cortex layers). In this manner, an abstraction may be provided having a larger time window and specific content to the common objects that causes sensor stimulations in a common physical environment. Hence content of the signal patterns such as piano, voice or piano and voice together can be described in the upper layers in some examples. This type of cascaded use of cortices may facilitate energy optimization of encoding systems described herein. The more experience from the physical world within the same location is obtained, the more the encoding systems described herein may adapt, and less energy may be dissipated since a sort of translation of the most probable periphery may be copied into encoding system. Encoding the signal patterns in a defined way may not only increase the entropy in thermodynamics due to minimization of the energy, it may also increase (e.g., maximize) the entropy of information defined by Claude Shannon. For this reason, examples of encoding systems and methods described herein may optimally encode input signal patterns. Since the morphological connections inside the system, in terms of visited nodes, are descriptive for classification of the content, coding systems described herein may facilitate perceptual classification and analytics of the input signal patterns in the encoded form, which may be different than an approach of existing codecs.

Examples described herein may facilitate histogram coding for distribution of the morphological circuit branches in terms of convolutional features, if the initial condition of the system is equally known as in the case of silicon based computational platforms. This can be used, for example, to speed up the training process or can be followed by error coding for lossless or less lossy coding with or without trained networks (e.g., cortices). Examples of codecs described herein may be trained prior to use, and/or real-time training may be used where a coding network may be trained during use. Generally, two types of recovery of the original signal patterns may be used. In some examples, decoding may be performed using a mathematically inverse transform. This may be implemented by computing systems, such as computers. In some examples, decoding may be performed using trained generation. In this method another training is applied for an output cortex that drives actuators so that sensory feedback will be equalized to the output. This may be analogous, for example, to how humans team to speak. After training, the content may be played back.

Examples systems and methods described herein may have a variety of desirable attributes and may facilitate a variety of advantageous actions. Not all examples of systems and methods may have all, or even any, of these desirable attributes and advantageous actions. However, some desirable attributes and advantageous actions may be described to facilitate appreciation of systems and methods described herein.

Systems and methods described herein may facilitate encoding and decoding of 1D, 2D, 3D and for n-D signal patterns by using pretrained morphologically-adaptive coding networks or equivalent histogram distribution of a pretrained cortex, which may increase an available compression rate while providing an encoded data output which may remain queryable (e.g., analytically processable) in encoded form.

The morphologically-adaptive coding network may be shared and/or updated for different kind of dam (e.g., audio, video, tactile etc.) and/or sensory systems so that decoding devices may decode the data or relevant signal patterns.

Examples described herein may construct a morphologically-adaptive coding network with respect to convolutional features of input data (e.g., input signal patterns) and energy dissipation may be used for reinforcement learning. Such process may yield increased (e.g., maximum) thermodynamic entropy as well as an increased (e.g., highest possible) entropy of information. In this manner, the input data (e.g., signal patterns) may be encoded in a most optimal manner.

Examples of systems and methods described herein may manage fidelity versus compression size. Fidelity generally refers to a measure of quality in multimedia signal coding. A same biomimetic codec (e.g., a same morphologically-adaptive coding network) may be used in different levels of encoding the signal with respect to physical bandwidth availability of the communication system. In this manner, higher compression rate may be provided than the conventional multimedia data compressors but also an optimization of the quality of the content with respect volatile condition of the communication bandwidth may be achieved.

Examples of training (e.g., learning) of coding networks may utilize minimum energy-maximum entropy relationships to arrange independent nodes in a given system. This may result in a non-deterministic structure which may both boost processing energy efficiency in embedded system implementation and conserve processing power.

Link list type coding may be used in computer implementations of systems described herein, which may facilitate efficient use of memory. This may be in contrast to matrix type predefined weight adaptation used in conventional neural networks.

Examples of morphological adaptation described herein may provide reduced space and/or space-free intelligent structures that may optimize resources and enable fair management of expertise with respect to probabilistic requirements at changing perceptual ambient physical conditions.

In some examples, the energy distribution between parallel nodes of morphologically-adaptive coding networks described herein with respect to their inverse proportional distribution of rates may provide absorption of the recognized (e.g., common) pan of the convolutional features that increases selective adaptation of the relevant pan of the network mote than the others while the remaining part of the energy is used in morphological development of newer paths. In this manner, probabilistic distribution of the sensory signals input or input signals may be optimally encoded in a queryable form.

Examples of morphologically-adaptive coding networks may convert hillocks of nodes into a connection to a child node when heat level of the node goes above a threshold towards a hillock direction inside the system volume. In this manner, mid and long term morphological development and adaptation outside the perceptual time window may be achieved.

In some examples, a cascaded connection of cortices (e.g., biomimetic encoders) after the first group that is connected to receive input data (e.g., connected to sensors or applied signal inputs), provides an abstraction of the inputs proportional to the cascading amount. In this manner, perceptual coding and cognitive functions depending on variation of longer short term applied signal durations may be achieved.

In some examples, a serial connection of nodes may be provided in a morphologically-adaptive coding network in a tree structure, from toot to leaves. The nodes may correspond with wavelet coefficients and the structure of the network may be generated through heat oriented morphological adaptation. In this manner, computational implementation (e.g., using one or more processors such as CPUs and/or GPUs) may be achieved.

In examples of training morphologically-adaptive coding networks described herein, maximum entropy adaptation of child nodes may be performed not only as separate phase of training, but also used as a part of real time encoding of input data. In some examples, synchronization of multiple biomimetic codecs may utilize additional communication as a part of an update phase. Accordingly, in some examples, not only applied signal inputs (e.g., input data such as multimedia data) but also sensory inputs such as audio signals from a microphone or other sensor data may provide a common way of sharing intelligence over cloud platforms to larger common sets of cortices.

Abstraction of data may be achieved in some examples by sequencing the visited leaf codes so that the resulting compressed data may be applied as another signal pattern (e.g., as input data) to other cortex(es). Therefore, a compression rate of the information may increase while foe loss rate experiences less increase. The difference of the encoded signal and foe original signal may be encoded also by applying both data to the biomimetic codec. Accordingly, cascaded cortices (e.g., cascaded biomimetic codecs) may not only utilize abstract coding but also may increase the overall entropy and the compression rate.

FIG. 1 is a schematic illustration of a system arranged in accordance with examples described herein. The system 100 includes biomimetic codec 102 and morphologically-adaptive coding network 104. The system 100 may receive input data and provide compressed data 106. Additional, fewer, and/or different components may be used in other examples.

Examples of biomimetic codecs, such as biomimetic codec 102, may advantageously compress data using a morphologically-adaptive coding network, such as morphologically-adaptive coding network 104. Generally, this may allow for data compression (e.g., encoding) which may provide output data which is compressed, yet queryable.

Codecs, such as biomimetic codec 102 may receive input data. Various types of input data may be used, including, for example, audio (1D), image (2D), video (3D) other sensory patterns (xD) data, or combinations thereof. Input data may also be referred to as raw data. Examples of input data formats include wav and .bmp, although other formats may be used. In some examples, the input data may itself be compressed data output from encoders described herein (e.g., bic format). Input data may be received from season described herein, including but not limited to, environmental season (e.g., temperature, humidity, position, inertial sensors), image sensors, light sensors, microphones, synthetic ears. Other sensors may be used in other examples.

Biomimetic codecs described herein utilize morphologically-adaptive coding networks to compress (e.g., encode) data. The morphologically-adaptive coding networks may be adapted and/or trained data templates which may represent expected common features in input data. The morphologically-adaptive coding network, such as morphologically-adaptive coding network 104, may include layers of nodes. Each node may include multiple hillocks. Connections between selected nodes may be provided at selected hillocks. The connections made may be based on energy dissipation with respect to spectral component variation of applied test data. In some examples morphologically-adaptive coding networks described herein may be represented as a set of histogram functions. In some examples, the morphologically-adaptive coding network 104 may be trained to develop the layers of nodes by providing a next layer node at a selected hillock of a previous layer node, the selected hillock having stimulation rales above a threshold using the test data. The nodes may also be referred to as leaves, and paths of leaves through the network may be referred to as branches. In some examples, the nodes are related to changes of tire input (e.g., sensor input in some examples) in a rolling lime window (e.g., over a time constant). The nodes may accordingly include relational information to the origin of the signal (e.g., they may contain information regarding the relationship of the input data to common input data of that type). Variation of the leaf numbers over a longer term may have higher entropy. In this manner, the number and arrangement of nodes may be particular to a trained first morphologically-adaptive coding network. The number and arrangement of nodes, and functions implemented by the nodes, may be indicative of common features of signals expected to be received from a particular type of source, from a particular environment, or other classification. In this manner, use of a morphologically-adaptive coding network may allow for encoding to occur with an awareness of the context (e.g., common features) expected in an input stream.

Examples of morphologically-adaptive coding network may be trained using test data. In some examples, the test data used may be based on the anticipated input data to be encoded using the morphologically-adaptive coding network. For example, if classical music is anticipated to be encoded, the morphologically-adaptive coding network 104 may be trained using test data indicative of classical music. This may allow the morphologically-adaptive coding network 104 to be developed in a manner which is representative of common features and context of classical music. Training may occur prior to encoding of input data in some examples. In some examples, training may occur wholly or partially during use of the system. For example, some or all of the input data being encoded by the biomimetic codec 102 may also be used as training data to further train the morphologically-adaptive coding network 104.

In some examples, each of the nodes of the morphologically-adaptive coding network 104 have an associated time constant. The next layer node may have a smaller time constant than the previous layer node. Ending nodes of the morphologically-adaptive coding network 104 may have equal probabilistic frequency distribution. For example, an arrangement of nodes may be developed for the morphologically-adaptive coding network 104 such that each ending node may have an equal likelihood. This may result in uneven branch lengths in the morphologically-adaptive coding network 104 in some examples.

The biomimetic codec 102 may encode the input data. For example, the biomimetic codec 102 may apply the input data to the morphologically-adaptive coding network 104. The input data may visit various nodes and hillocks of the morphologically-adaptive coding network 104. The biomimetic codec 102 may output an identification of ending nodes of the morphologically-adaptive coding network visited by the input data. In some examples, the biomimetic codec 102 may output an identification of hillocks at last nodes (e.g., last layers) of the morphologically-adaptive coding network 104 which were visited by the input data. For example, the biomimetic codec 102 may output an index of visited nodes of the morphologically-adaptive coding network. This may be referred to as leaf sequences in some examples (e.g., where the nodes may be refereed to as leaves). In some examples, applying the input data to the morphologically-adaptive coding network may include applying a convolutional (Unction to the input data. Any of a variety of convolutional functions may be used including, but not limited to, a wavelet transform (e.g., a wavelet function). Accordingly, one or more wavelet functions may be convolved with the input signal patterns. The wavelet coefficients may be evaluated as series of signal features in construction of the morphologically-adaptive coding network. In some examples, the input data may be filtered before application to the morphologically-adaptive coding network, for example using a low pass filter.

Accordingly, biomimetic codecs provide output data, such as compressed data 106 of FIG. 1. The compressed data 106 may include compressed metadata and features and context data. The compressed dam 106 may include the identification of ending hillocks at last layers of the morphologically-adaptive coding network 104 which were visited by the input data applied to the morphologically-adaptive coding network 104. Note that, using examples of biomimetic codecs described herein, the compressed data provided by the codecs may be queryable. Generally, the morphologically-adaptive coding networks used by biomimetic codecs described herein may be object-oriented, coo text-aware networks. This may allow the compressed output data to retain meaning and order, which may allow for queries on the output data. This is in contrast to conventional compression techniques, such as .jpg, which may provide a compressed dam stream which is random, and itself not queryable.

Analogous decoders may be provided to decode the compressed dam of FIG. 1. For example, the compressed data 106 may be decoded using a biomimetic codec described herein (e.g., the biomimetic codec 102 of FIG. 1 in a decoding mode). The decoder may similarly utilize a morphologically-adaptive coding network to decode the compressed data. In some examples, a decoder may utilize a mathematically inverse transform to inverse the operation of an encode (e.g., biomimetic codec 102). In some examples, decoding may be performed using trained generation. During trained generation, input data may be provided to the biomimetic encoder. The input data may be provided from, for example, a microphone and/or a synthetic ear. Feedback may be provided based on the output or an encoder (e.g., biomimetic codec 102). The output may be played back (e.g., using a playback actuator). Playback actuators may include, but are not limited to, speakers such as inductive speakers and/or piezo speakers, and/or a synthetic throat. The feedback may be used to adjust operation of the biomimetic codec 102 and/or the morphologically-adaptive coding network 104 to obtain output data having a desirable correspondence with the input data.

During operation, biomimetic codecs described herein may encode (e.g., compress) input data using one or more first morphologically-adaptive coding networks. While a single morphologically-adaptive coding network 104 is shown in FIG. 1, any number may be used, and they may be used in series or in combination. For example, the biomimetic codec 102 may encode the input data using the morphologically-adaptive coding network 104. Data output by that encoding process may in some examples be encoded one or more additional times, for example using a different morphologically-adaptive coding network. In some examples, a biomimetic encoder described herein may select a morphologically-adaptive coding network (be use in encoding input data bused on the type, context, and/or content of the input data. For example, the biomimetic codec may select one morphologically-adaptive coding network to encode audio data and another morphologically-adaptive coding network to encode image data. In another example, the biomimetic codec may select a morphologically-adaptive coding network based on environment (e.g., one morphologically-adaptive coding network may be used to encode signals received from one environment and another morphologically-adaptive coding network may be used to encode signals received from a different environment). Accordingly, the morphologically-adaptive coding network used and/or selected may be based on a type of the input data. In some examples, different morphologically-adaptive coding network may be used based on the content and/or anticipated content of the input data. For example, one morphologically-adaptive coding network may be used to encode classical music, while another morphologically-adaptive coding network may be used to encode heavy metal music. In some examples, the input data may include metadata or other data which may identify an aspect of the date for use in selecting a morphologically-adaptive coding network to use to encode the data.

In operation, to decode date encoded using morphologically-adaptive coding networks described herein, the morphologically-adaptive coding network may additionally be used to decode the data. Accordingly, in same examples, the morphologically-adaptive coding network may be transmitted to a decoding device (e.g., a decoder) for use in decoding data. In some examples, the morphologically-adaptive coding network may be transmitted during a time of low network traffic to reduce and/or avoid an impact on network latency by the transmission of the coding network. In some examples, the decoding device may have access to multiple morphologically-adaptive coding networks for use in decoding data. In some examples, the encoded data may include and/or be accompanied by data which aids in identification of a morphologically-adaptive coding network to use in decoding the data. Decoding the data may result in recovery of an approximation of the input data in some examples. Examples of such a decoding process may be referred to as lossy. In some examples, differential data (e.g., a difference between the input data and the decoded compressed data) may be stored and provided to a decoding device together with the compressed data. The differential data may be used to recover the input data more completely (e.g., lossless decoding).

Generally, examples described herein may utilize one or more training devices, one or more encoding devices, and one or more decoding devices. In some examples, a single device may be used to implement multiple of those described devices. For example, a single device may be both a training device and an encoding device. A single device may be both a training device and a decoding device. A single device may be both an encoding device and a decoding device. Generally, the devices described may have sufficient processing capability to perform the described actions (e.g., training, encoding, and/or decoding). For example, the devices may include one or mote processors and computer readable media encoded with executable instructions for causing the device to perform training, encoding, and/or decoding (e.g., training, encoding, and/or decoding as described herein). In some examples, the devices may utilize circuitry (e.g., application specific integrated circuits (ASICs), field programmable gate arrays (FPGAs)) to perform all or portions of the actions described.

During operation, a training device may train one or more morphologically-adaptive coding networks based on one or more sets of test data. The test data used may have attributes similar to data expected to be encoded and/or decoded using techniques described herein. An encoding device may have access to the trained morphologically-adaptive coding networks. For example, morphologically-adaptive coding networks) may be stored in electronic storage (e.g., memory, disks) accessible to the encoding device. The encoding device may receive input data, optionally select a morphologically-adaptive coding network for use in encoding the input data, and encode the input data using the selected morphologically-adaptive coding network. A decoding device may also have access to the trained morphologically-adaptive coding network(s). For example, the morphologically-adaptive coding network(s) may be stored in electronic storage (e.g., memory, disks) accessible to the decoding device, in some examples, the morphologically-adaptive coding network(s) may be transmitted (horn the training device and/or the encoding device to the decoding device. In some examples, the encoding device and decoding device may have access to a same electronic storage hosting the morphologically-adaptive coding networks).

In some examples, the morphologically-adaptive coding networks) used may change over time. The change may be discrete and/or continuous. Generally, the rate of change of the morphologically-adaptive coding networks) may be slower than an anticipated rate of input data and/or of encoding. In some examples, the morphologically-adaptive coding network may change due to additional training from experience with incoming input data over time. In some examples, periodically (e.g., from time to time and/or at regular intervals), an encoding and/or decoding device may be provided with a changed first morphologically-adaptive coding network (e.g., from a training device) resulting from further training by additional training data.

Figure 2:
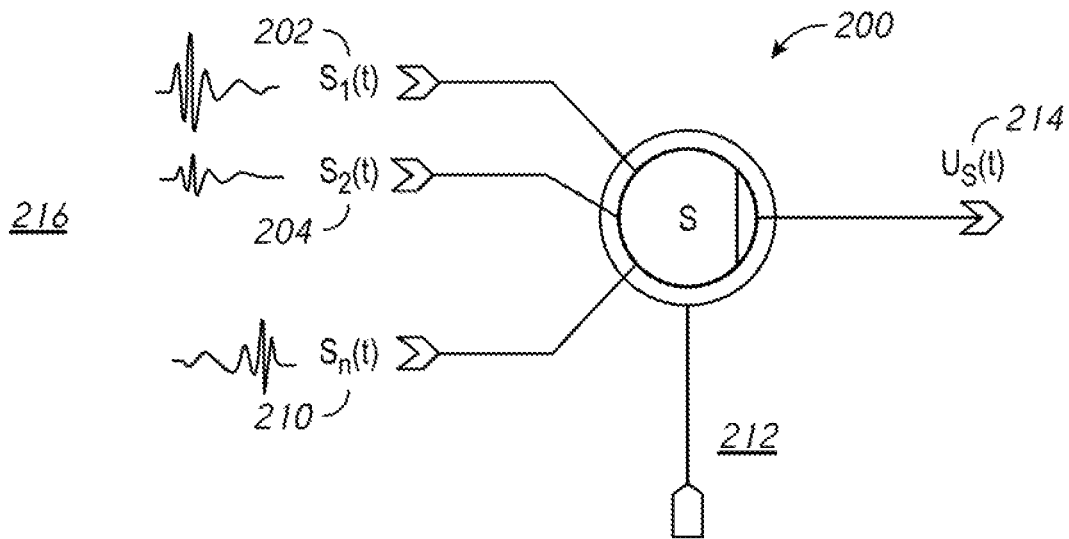
FIG. 2 is a schematic illustration of two views of a node of a morphologically-adaptive coding network arranged in accordance with examples described herein.
Figure 2:
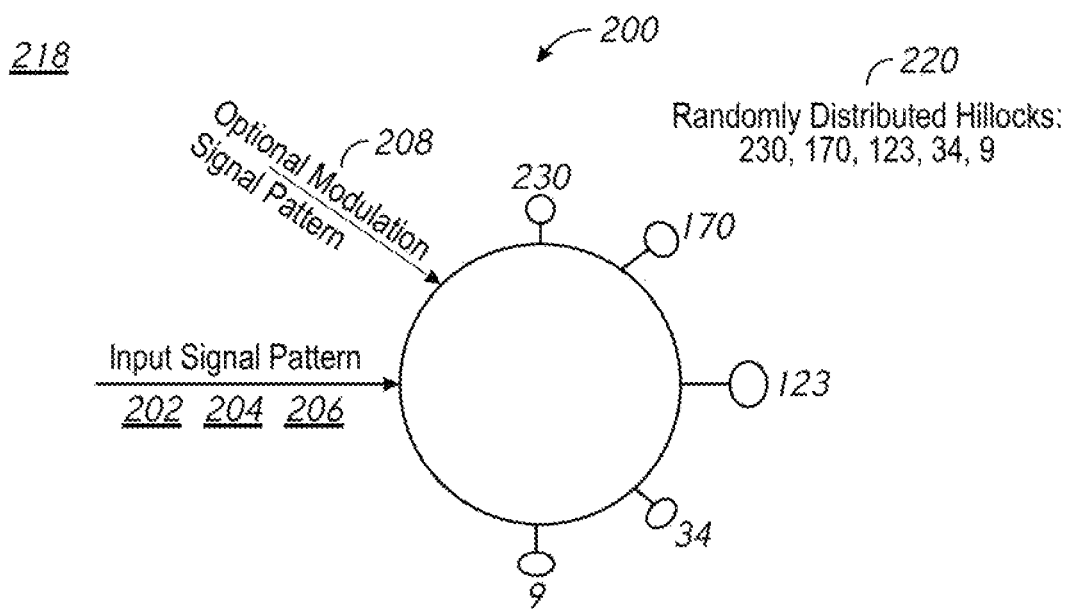

FIG. 2 is a schematic illustration of two views of a node of a morphologically-adaptive coding network arranged in accordance with examples described herein. In the view 216, the node 200 is shown with three inputs—input 202, input 204, and input 210. The node 200 has one modulatory input 212. The node 200 has an output 214. The input 202 may receive an input signal $S_1(t)$. The input 204 may tactile an input signal $S_2(t)$. The input 210 may receive an input signal $S_3(t)$. The node 200 may be associated with a value, shown as S in FIG. 2 utilizing the inputs from input 202, input 204, and/or input 210. In some examples the value S associated with the node 200 may be calculated in accordance with input from the modulatory input 212. The node 200 may provide the output signal $U_s(t)$. Any number of input, outputs, and/or modulatory inputs may be used to implement other examples of nodes.

Nodes described herein may be implemented in hardware, software, or combinations thereof. In some examples, nodes may be implemented using computational materials.

In providing, generating, and/or training a morphologically-adaptive coding network, a first layer (e.g., one or more nodes) of nodes may be provided by assigning hillocks to the nodes without any connections yet between nodes. The hillocks may refer, for example, to possible values of the output signal for tee node.

In the view 218, tee node 200 is shown with hillocks 220. The node 200 is illustrated in view 218 as having an input signal pattern (e.g., which may correspond with input 202, input 204, and/or input 206 of view 216) and an optional modulation signal pattern 208 (e.g., which may correspond with modulatory input 212 of view 216). In the example shown in FIG. 2, hillocks are provided on the node 200 at values of 230, 170, 123, 34, and 9. These values may correspond, for example, with values of tee output signal for tee node—e.g., $U_s(t)$. The output signal may correspond with spectral features of the input signal in some examples and/or may correspond with stimulus to be provided to (lather child nodes in some examples. For example, the values may refer to a wavelet coefficient for a particular frequency component. For example, at a first level, tee hillock value may be a wavelet coefficient ter a lowest frequency (e.g., DC average) component of an input signal.

Input applied to the modulation input—e.g., modulatory input 212—may be used to change a spectral response of input filters. For example, input signals may be modified and/or combined, such as by being filtered, prior to and/or during being used by the node 200 to provide an output signal. The modulatory input 212 may be used to alter the manipulations performed on tee input signal(s). In some examples, no input, and/or a 0 or other predetermined input at the modulatory input 212 may cause the input signals to be decomposed into low pass filter (LPF) and high pass filter (HPF) components. For example, a low threshold may be used, and one filter may output spectral components of input signal(s) below the low threshold. A high threshold may additionally or instead be used, and one filter may output spectral components of input signal(s) above the high threshold. In some examples, the low and high thresholds may be the same. In some examples, the low and high thresholds may be different. In some examples, a signal may be applied to modulatory input 212 to alter tee manipulations used on the input signals). The modulation may be used, for example, when cognitive encoding and decoding is used, such as in more advanced operations. In some examples, no input may be provided to the modulatory input 212 when the node is functioning as feedforward regular coding or encoding. Generally, in a morphologically-adaptive coding network, the first layer of nodes may receive inputs from sensory systems or other streaming data sources, and accordingly may not have input to the modulatory input 212. Nodes of subsequent layers, however may utilize a variety of inputs to their modulatory inputs. Use of the modulatory input 212 may allow a same input set of input data (e.g., signal patterns) to be interpreted in different ways based on the context and/or other criteria.

To begin development of a morphologically-adaptive coding network, any number of nodes, such as node 200, may be provided as initial (e.g., first) nodes. Hillocks and connection values to a next node at each layer of nodes generally may represent set of features (e.g., features that may be expected to be present in an input signal). During development, signals (e.g., test signals) are applied to nodes of the input layer. Each node may have a time constant. The time constant of the node may determine a time over which the input signal effects a particular output signal. Generally, nodes in the same layer of the morphologically-adaptive coding network may have different but relatively close time constants. When beginning development of a morphologically-adaptive coding network, the time constants of the nodes may initially be equal and/or randomly assigned within a prespecified range for the same layer level.

Untrained networks may not have connections between nodes, accordingly, initially a number of initial nodes may be present with an initial distribution of hillocks. Then test data may be applied to the first layer of nodes to begin training. The network will develop responsive to training such that energy dissipation is reduced with respect to spectral component variation of the applied signal patterns (e.g., symbols) within a probabilistic distribution in different time frames. The network is developed to provide convergence to equally probable feature decomposition at the ending nodes and this may increase (e.g., maximize) the entropy of the information (H) as an indication of optimal coding. Entropy of the information is expressed as a statistical expected value, in terms of probability of symbols consisting of signals as follows:

$$H(m) = -\Sigma_{i=1}^{n} P_i \log_2 P_i \quad \text{Equation 1}$$

Energy dissipation is evaluated at a node using a sec of rules. When input data (e.g., a signal pattern) is decomposed into spectral components at a node, for example using fitters, its spectral distribution within the time constant of the node is linked to the closest hillocks as features. Differences between the new feature value and the existing values is considered to "heat up" the system. If the difference values become over a threshold, the hillock may be used to form a connection to anew node having a smaller lime constant. The smaller time constant may be smaller by any amount, such as three-quarters, two-thirds, half, one-third, one-quarter, or some other fractional or absolute amount.

When the input data has similar features to an existing child node, the value associated with the node and/or hillock may be updated in proportion wife fee difference and fee frequency of occurrence of such signal patterns. In this manner, some feature oscillations around a child node's existing value may not cause a change (e.g., addition of a new node), particularly if the volatility is homogeneously distributed in time such that the value does not attain the threshold, or does not attain the threshold for longer than a threshold amount of time.

In this manner, formation of additional nodes in a morphologically-adaptive coding network may be driven by differences in input signals from the existing node structure (e.g., "heat"). Note feat signals may not be represented only by their features, but their spectral or convolutional impedance to the existing state of the network is also considered. This is in contrast to conventional neural networks and may provide convergence of morphological adaptation to certain predefined accuracy of fee system.

Figure 3:
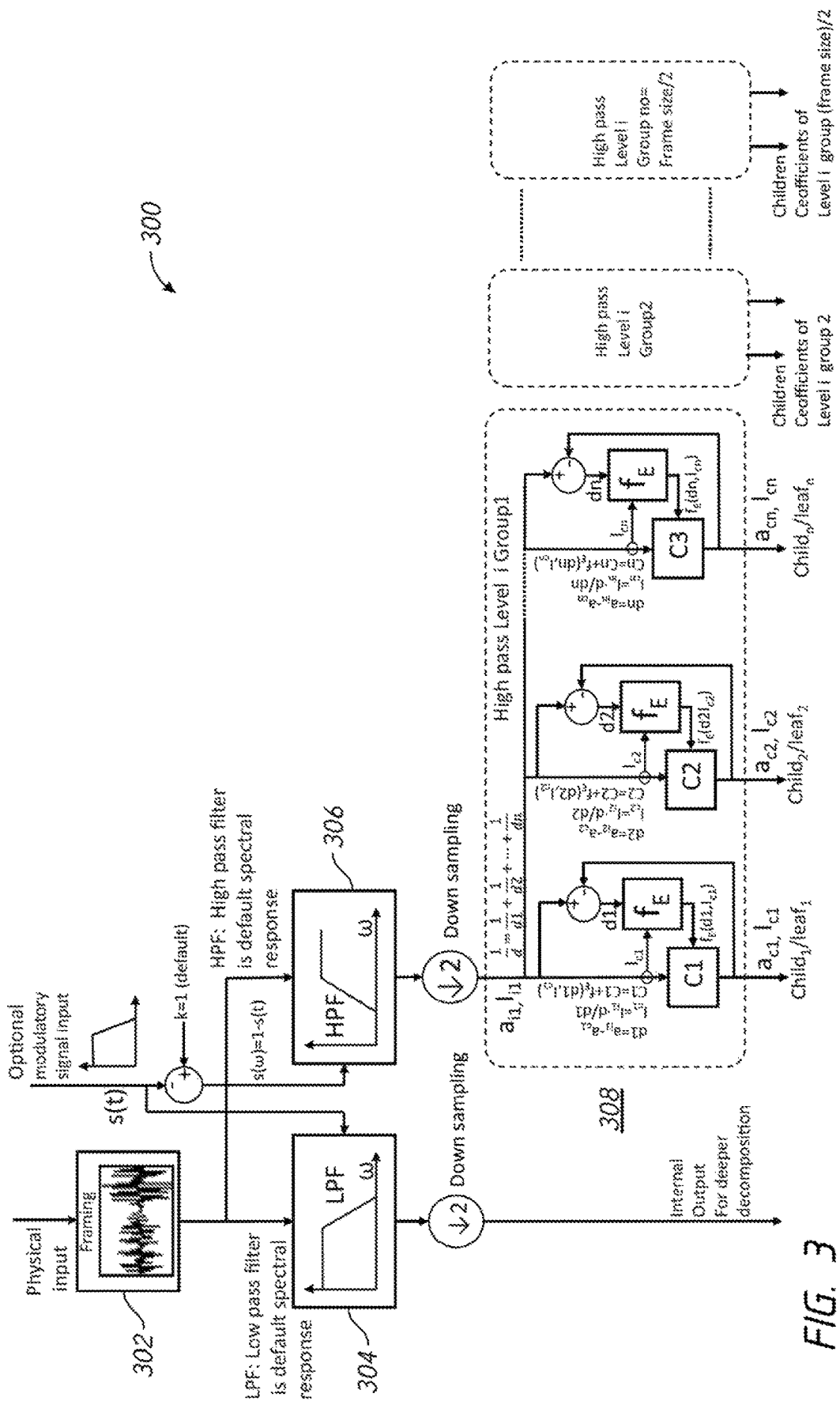
FIG. 3 is a schematic illustration of a node arranged in accordance with examples described herein.

FIG. 3 is a schematic illustration of a node arranged in accordance with examples described herein. FIG. 3 provides an example of signal processing which may be performed by nodes of morphologically-adaptive coding networks described herein. The node 300 includes framing block 302, filter 304, filter 306, and energy calculation stage 308. Additional, fewer, and/or different components may be used in other examples. The node 300 may be used to implement the node 200 of FIG. 2 in tome examples.

FIG. 3 generally provides an example showing heat energy driven ($f_E$) value adaptation and morphological connection based on convolutional distances.

Input data may be provided to framing block 302. Input data (e.g., input signals) may be framed by framing block 302 in two ways at initial nodes of networks described herein—synchronous mode or asynchronous mode. Synchronous framing may include sequential capturing of q signal samples with over the time constant of the node. Asynchronous framing may start when any signal or its spectrally decomposed feature is above a sensitivity value and asynchronous framing may end by the framing size of the node. Asynchronous mode may be used especially in parallel processing systems and synchronous framing may be used for basic demonstrations in computational platforms. Either mode may be used in examples described herein and combinations may be used. Although the same signal may be framed by multiple nodes if their inputs are connected together, distribution of the energy of the signal will be proportional to the spectral conductivities and the total value may be normalized to 1.

The framed input data may be provided to filters, such as filter 304 and filter 306 of FIG. 3. Operation of the filters may be altered by modulatory inputs as described herein. Absent a modulation input and/or when the modulatory input is W or other predetermined value, the filters may provide a low pass fiber (e.g., filter 304) and a high-pass filter (e.g., filter 306) to select low frequency spectral features, and high frequency spectral features, respectively. The low pass filter portion may be used to stimulate hillocks as described herein. The high pass filter portion may be used to provide feedback to one or more parent nodes.

After feature extraction performed by the fibers, foe filtered framed input data may be optionally downsampled and provided to an energy calculation stage 308. The energy calculation stage 308 may sum differences in the spectral features from the hillock value for each hillock of the node and may stimulate child nodes, designated as Child$_1$ and Child$_2$ for example, in FIG. 3. In some examples, it may be the portion of the filtered framed input data from foe high-puss filter that is provided to the energy calculation stage 308. In some examples, the portion of the filtered framed input data from the low-pass filter may be used internally in the coding network for deeper decomposition.

Generally, the hillock may be associated with a heat value. The heat value may increase (e.g., "heat up") responsive to differences between the input signal spectral components and the hillock values. In some examples, the value may increase proportional to the square of the difference, and it may be referred to as $f_E$, as shown in FIG. 3. Heating time constant a is predefined and it may relate to learning speed. If this value is passed over a predefined threshold then the hillock may form a connection to a next layer node having a smaller time constant.

The hillock and/or existing child node heat value may be modified proportional to the difference and adaptation time constants. Existing nearest nodes may pass the remaining part of the signal (e.g., the difference signal) to their connected child nodes in inverse proportionality to the feature distances measured by beat and the feature value.

While examples have been described of morphologically-adaptive coding networks having layers of nodes that vary from largest to smallest time constant, in some examples the opposite order may be used (e.g., smaller time frame to larger time frame spectral feature decompositions).

As an example of a manner of calculating beat values for a node, consider that spectra) impedance within an angular frequency interval $\omega 1$ and $\omega 2$ may be written as:

$$z_{|w1-w2|} = \int_{\omega_1}^{w_2} \frac{\vec{U}(\omega)}{\vec{I}(\omega)} d\omega \quad \text{Equation 2}$$

Another distance between the signal pattern s(t) and the template function c(t) is, $$d_i = (s*c)(t) = \int_{\tau=0}^{\tau} s(\tau) \cdot c(t-\tau) d\tau \quad \text{Equation 3}$$

where feature distances satisfy the relationship $$\frac{1}{d} = \frac{1}{d_1} + \frac{1}{d_2} + \cdots + \frac{1}{d_n} \quad \text{Equation 4}$$

Figure 14:
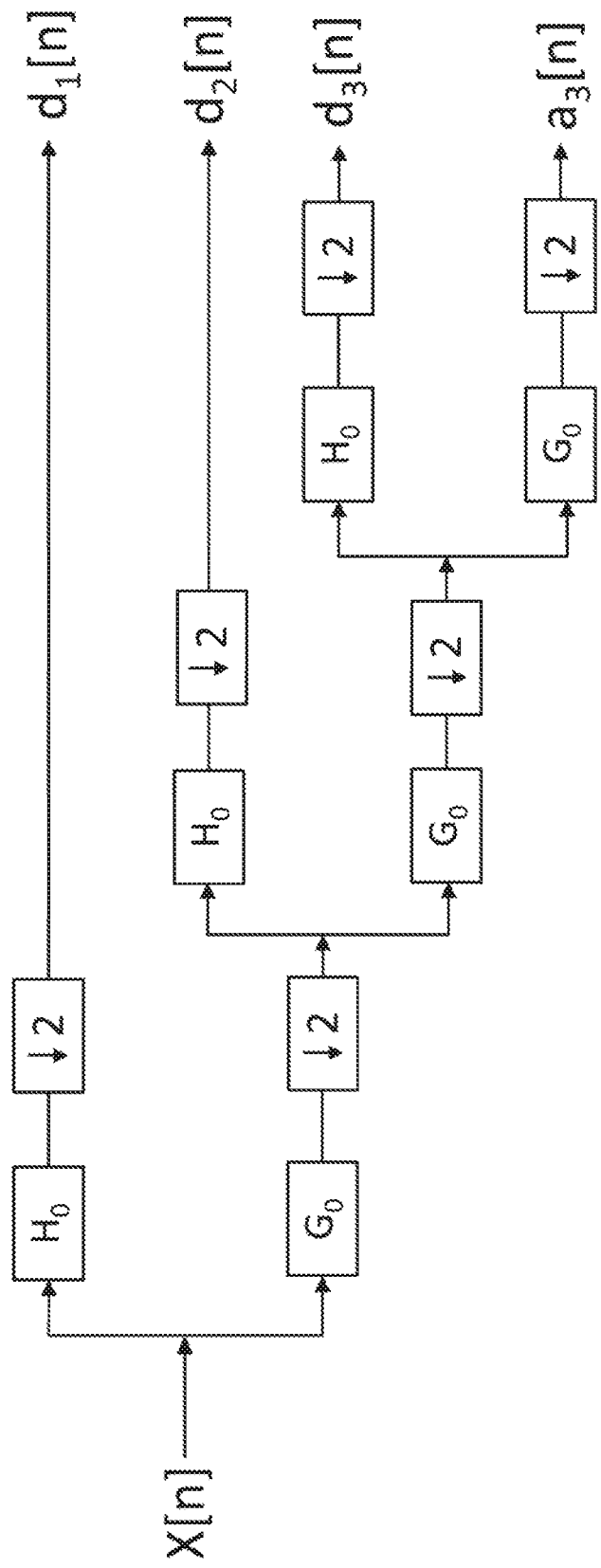
FIG. 14 is a schematic illustration of an example of an arrangement of high pass (H0) and low pass (G0) filters in accordance with examples described herein.

While two fibers are shown in FIG. 3, in some examples, any of a variety of filters and filtering arrangements may be used. For example, in some examples, high pass and low pass filters may be arranged to perform a classical discrete wavelet transformation. An example of an arrangement of high pass (H0) and low pass (G0) filters arranged to perform a wavelet transform is shown in FIG. 14. In the example of FIG. 14, consider an input signal X(n) to be framed having 8 samples. The input signal X[n] may be applied to high pass filter 1402 and downsampled. This may provide d1[n] including 4 data values. The input signal X[n] may be applied to low pass filter 1404 and downsampled. The downsampled output of low pass filter 1404 may be applied to high pass filter 1410 and downsampled, which may provide an output d2[n] including two (2) data values. The downsampled output of low pass filter 1404 may also be applied to low pass filter 1406 and downsampled. The downsampled output of low pass filter 1406 may be provided to highpass filter 1412 and downsampled, providing an output d3[n] which may include one 1 data value. The downsampled output of low pass filter 1406 may also be applied to low pass filter 1408 and downsampled, which provide output a3[n] which may have a value equal to the average of the 8 samples hi the input signal. Accordingly, the input signal may be transformed into d1[n], d2[n], d3[n], and a3[n].

Figure 15:
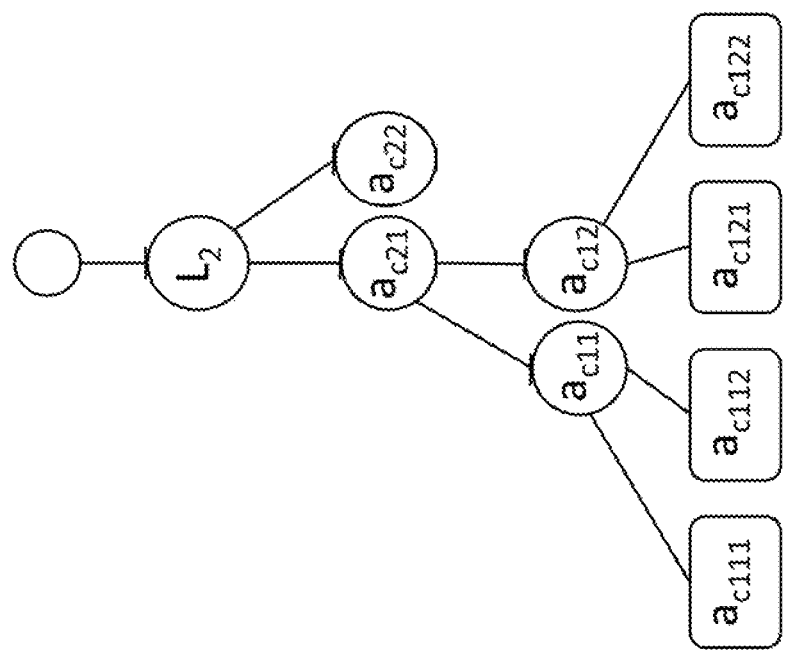

FIG. 15 is a schematic illustration of nodes of a morphologically-adoptive coding network arranged in accordance with examples described herein. The morphologically-adaptive coding network includes an arrangement of nodes which may be developed using nodes performing discrete wavelet transforms, such as shown in FIG. 14. Nodes may have alternative values depending on a conditional probability of array members. For example, instead of four (4) down sampled members of d1[n], a probability tree including possible different values of d1[n] sets may be formed. For example, if we a lime frame size having four (4) samples is used, then a highest frequency component may include four (4) values for each data set. In this case second level down sampling may be at the last level. So, as shown in FIG. 15, the L2 coefficient may be the first level component representing average of for samples for a specific signal. Different from conventional discrete wavelet techniques, depending on possibility of different averages, several children may be provided representing alternative L2s instead of one shown in FIG. 15.

In some examples, two alternative values for the second level data (e.g., $a_{c21}$ and $a_{c22}$ of FIG. 15), then two possibilities are provided. In such an example, $a_{c11}$ and $a_{c12}$ may represent highest frequency details. Each of $a_{c11}$ and $a_{c12}$ may include 2 sets representing coefficients that may also increase signal variations. Accordingly, flamed signals may be classified with in the listed possibilities:

$[ac_{11}(ac_{111},ac_{112})ac_{21}L]=S1$ $[ac_{12}(ac_{121},ac_{122})ac_{21}L]=S2$ $[0\ 0ac_{22}L]=S3$

If applied 4 signal samples (frame) has discrete wavelet coefficients that is exactly one of the listed alternatives then a number as 1, 2 or 3 can be used to represent the data since it may facilitate inverse wavelet transform. In examples described herein, the existing children values may be used to adapt and develop the network through conversion of randomly distributed hillocks to new children depending on distance and energy relations. This manner of network development may provide optimal coding of the data within each perception or purpose oriented cortex as similar to intelligent systems in nature. In this way, a resulting tree may be constructed so that foe visiting probability of its leaves converge to uniform distribution and entropy of the network is highest. Other entropy coding methods do not construct such a cortex reference beyond the applied signal frame size. If we also consider possible variations of $a_{c111}$, $a_{c112}$, $a_{c121}$, $a_{c122}$ then double amount of possibilities may arise for the given example. In some examples, multiple frame sizes may be used and/or cascaded cortices for higher level of relational encoding references within the encoding networks) so foot possible highest entropy can be increased in larger time intervals with respect to limited sampling frame sizes.

In some examples, the modulatory input from feedback lines or parallel other cortex networks. As shown in FIG. 3, a signal s(t) may be connected to specific output from another cortex. For example, a repetition rate of signal pattern features represented by stimulation of leases may provide a context type information with respect to specific orders in time or event based ordering outside time scope. In such examples, a signal s(t) that represents a more complicated condition, learning object, or context may be applied to another cortex through a morphologically-developed circuit that may be applied to another node which is a member of other cortex so that its energy can be conducted with less dissipation. The modulatory input shown in FIG. 3 may be used for this type of information, signal or data fusion nodes. When the modulatory input s(t) is applied then it may replace high pass and low pass standard filtering functions shown in FIG. 3. In such examples, pass band may also be a pattern determined by s(t). In practice, a context together with initial perception may drive decision making in this way. If the decision is correct, then coincidence probability of the context representation and the perceptual signal pattern representation will be reduced. Otherwise it will be increased and so energy dissipation will also be increased.

Accordingly, when output leaves of one cortex are partially connected as an input to another cortex, in fusion with a modulatory signal s(t) from another cortex, as a continuation of morphological development with respect to minimum energy dissipation rule, then, the repetition rate of signal pattern features, represented by the stimulation of the leaves, may provide context type information with respect to specific orders in time, or sequence of specific events without the consideration, of time.

Figure 4:
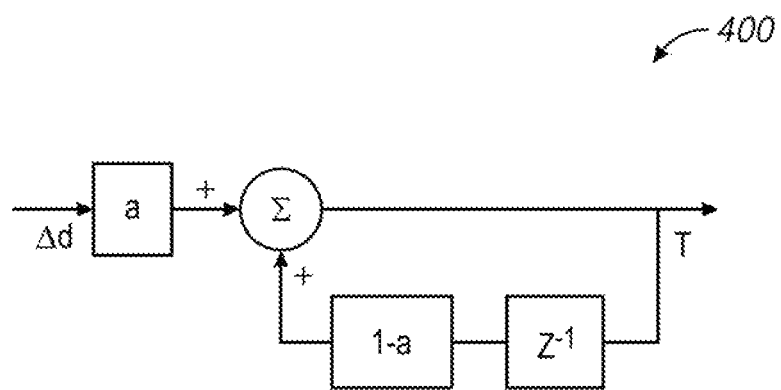
FIG. 4 is a schematic illustration of an energy accumulation function arranged in accordance with examples described herein.

FIG. 4 is a schematic illustration of an energy accumulation function arranged in accordance with examples described herein. The energy accumulation function 400 may be used to implement the functions $\Sigma E_h$ of the energy calculation stage 308 of FIG. 3 in some examples.

In the example of FIG. 4. $\Delta d=d^2$, d is the feature distance, a is the beating time constant and $z^{-1}$ is the time shift operator for discrete systems.

In FIG. 4, $\Delta d$ may be the distance when a signal is passed through most similar weighing child or stimulating a closest hillock if there is not a child there, $z^{-1}$ may refer to the lime shift operator. When a new value arrives it returns the previous one to add (1−a) portion to "a" portico of the input value. So "a" in FIG. 4 may refer to the percentage that determines heat up stimulation speed.

Accordingly, referring back to FIG. 2, reviewing view 218, consider an example where the node 200 is provided with input data which results in an output value (e.g., wavelet coefficient) of 45. The value 45 is between the hillocks 34 and 123, accordingly, each of those hillocks will "heat up" and their associated heat value will increase. The effective distance between the hillock 34 and the stimulus 45 is 34−45=−11. The effective distance between the stimulus 45 and the hillock 123 is 123−45=78. After a threshold amount of repetitive stimulation resulting in increased heat value, a new node will be formed from the node 200 at a hillock 45.

Accordingly, dissimilarity between an input signal and a coding network may be expressed as convolutional distance (e.g., wavelet coefficient difference) or spectral component distance (e.g., FFT) in a given time sampling time frame. This distance may be convened into an accumulated value. If the nearest connection of the node is a hillock but not a child node, and the hillock has heated above a threshold (e.g., has an accumulated value over the threshold) then it may be converted into a child node as a connection that may have and/or develop its own subnetworks through further child nodes.

Generally, closest hillocks to the applied signal feature may change their value depending on distance and repetition rate. If the distance is closer then possibility of hillock to be affected by the signal is higher. A hillock is convened into a child connection when there is enough amount of stimulation causes increasing the "heat" above a threshold. When converted into a child connection, generally no further child connections will be formed from the same hillock. Dissipation and related adaptation may continue downstream. When a hillock is converted into child connection then dissipated energy may be reduced. A similarity rate will generally determine the transferrable energy, and the transferrable pan of the energy may not raise a beat value. Generally, two neighboring hillocks may not make a connection to a common child, but they may be commonly affected by a signal. If two nodes have a common input, then their energy consumption may be inverse proportional to their feature distances (e.g., as in the case of parallel resistive circuits). So if one of the nodes has a child with much closer value to the input signal then it may transfer more energy (analogous to current flow) then the other. If the energy transfer rate is higher than possibility of its non-child connected hillocks to be converted into a child connection may be increased due to dissimilarity besides the energy transferring child connection.

Hillocks may change their values easier than the active child connections because there may be no transferable part of the energy and dissipation may drive adaptation. In the example of FIG. 2, consider the situation again where 45 is the signals wavelet coefficient for the lowest frequency (e.g., DC average of the framed signal samples since it is the first level coefficient). The closest hillocks are 34 and 123. If a signal pattern flame with 45 as first wavelet coefficient (a0) is repeatedly applied, then the first hillock at 34 may converge the signal faster than the hillock at 123 as neighboring hillocks. Meanwhile if this signal is continued to be applied with a0=45 then closest hillock value converge to 45 and since its temperature will raise fast due to absence of transferable part of the energy, it will be converted in to a child connection. Generally, the more circuit goes deeper at a specific feature as a0, a1, . . . $a_i$ due to higher frequency, the more detailed features will represent the details so that equal probability can be provided against the higher frequency of the applied features. Since the histogram of end feature distribution will equalize, entropy and compression efficiency may be maximized while recovery of frequently used signal patterns will have higher precision.

Figure 16:
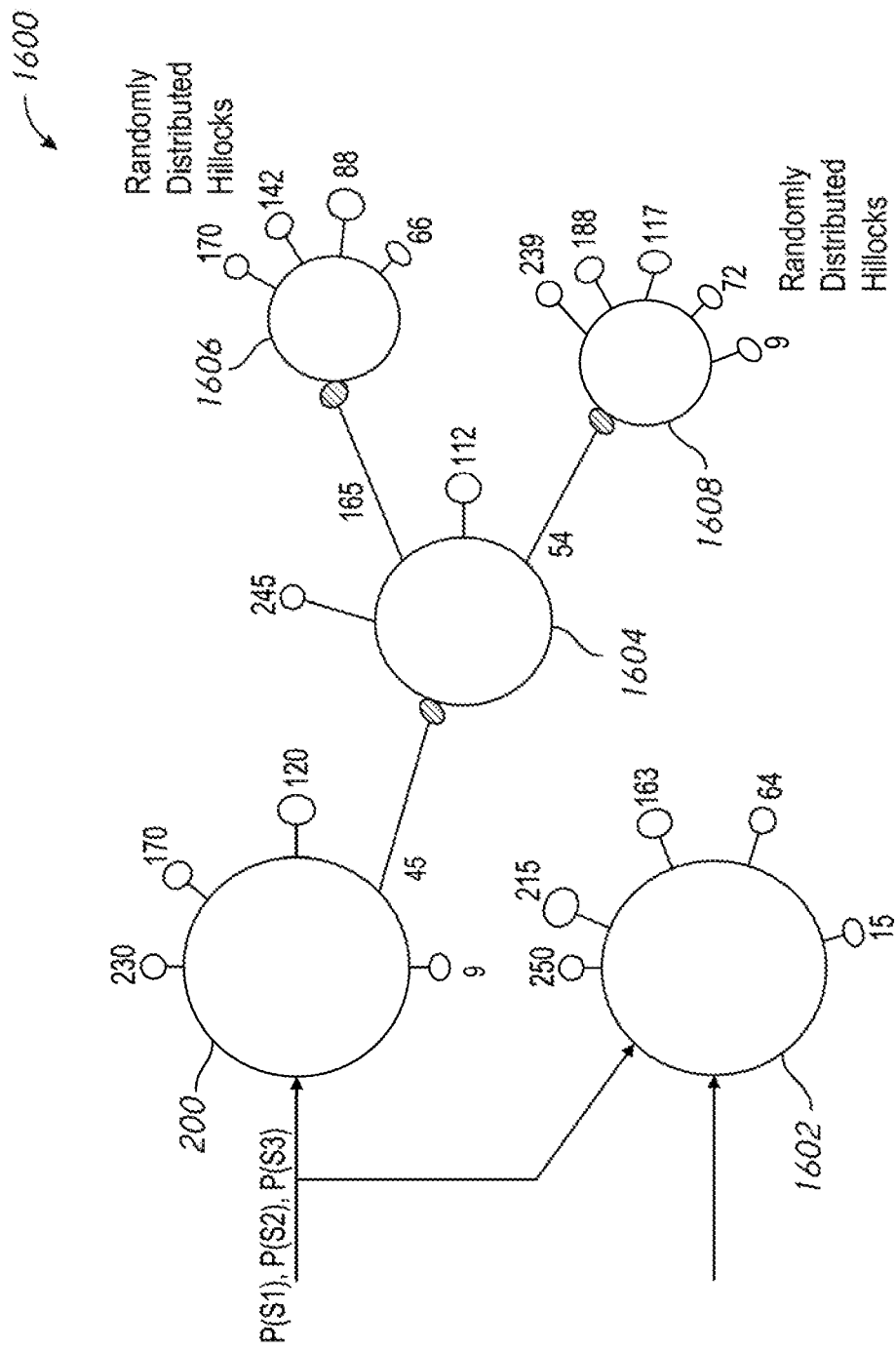
FIG. 16 is a schematic illustration of a morphologically-adaptive coding network arranged in accordance with examples described herein.

Accordingly, the node 200 of FIG. 2 may evolve through training into the morphologically-adaptive coding network 1600 of FIG. 16. The coding network 1600 may include the node 200, which, as described herein, may have been stimulated using an input signal providing a wavelet coefficient of 45 at the node 200. Accordingly, a child connection may be formed at the hillock having a value 45. In the example of FIG. 16, a node 1602 in a first layer may be provided in parallel with the node 200. The node 200 may form a child connection off the hillock at value 45 to node 1604. The node 1604 is shown having hillocks at 245, 165, 112, and 54. Responsive to stimulation, the node 1604 may provide child connections at hillock values 165 and 54. The node 1604 through the hillock associated with value 165 may form a connection to node 1606. The node 1604 through the hillock associated with value 54 may form a connection to node 1608. The nodes 1606 and 1608 may be ending nodes and may have randomly distributed hillocks.

Figure 5:
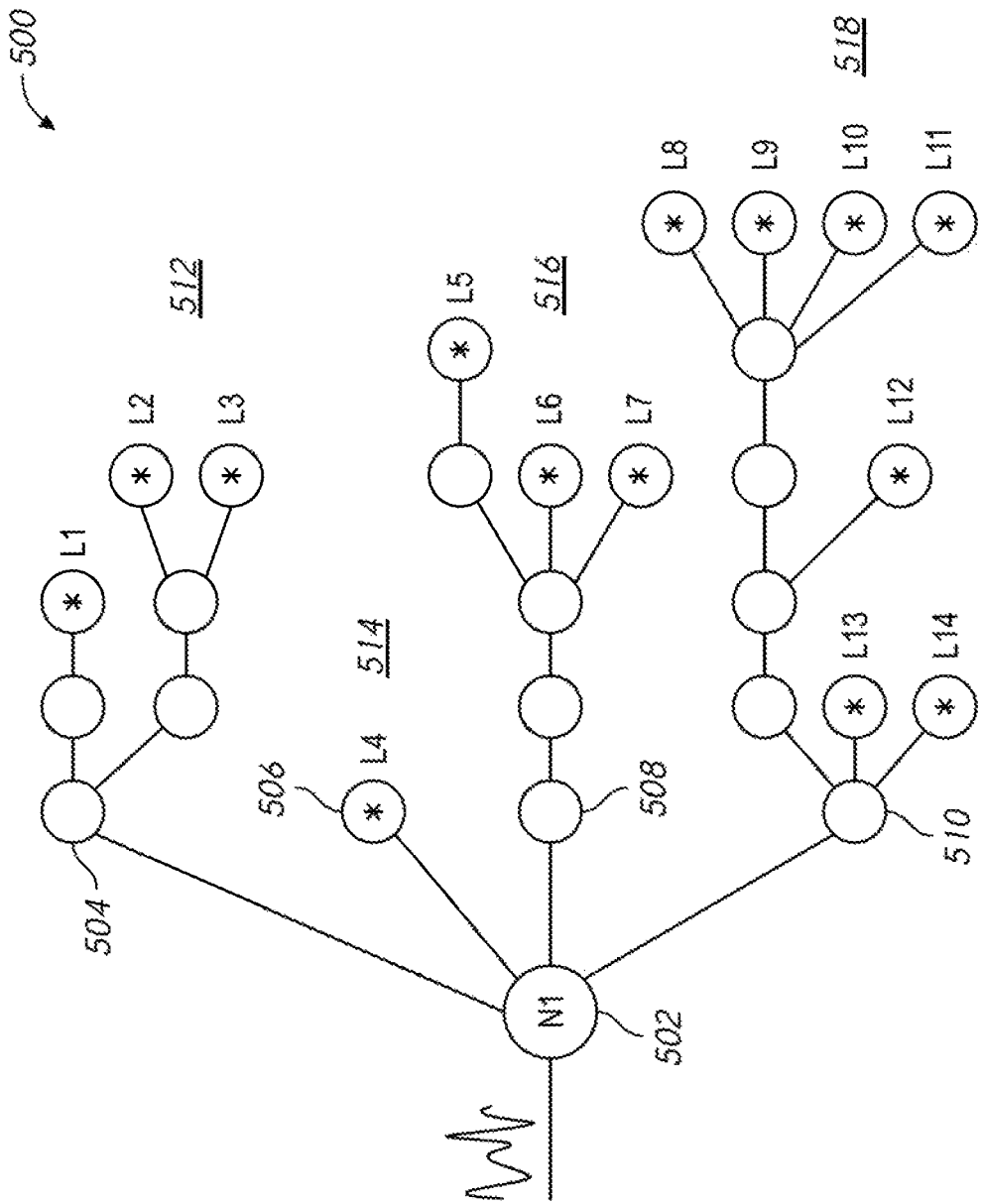
FIG. 5 is a schematic illustration of a morphologically-adaptive coding network arranged in accordance with examples described herein.

FIG. 5 is a schematic illustration of a morphologically-adaptive coding network arranged in accordance with examples described herein. The morphologically-adaptive coding network 500 includes an initial node 502. A next layer of nodes after the initial node 502 includes node 506, node 506, node 508, and node 510. For example, each of node 504—node 510 has a connection to initial node 502. Generally, each of node 504—node 510 may have been created from a hillock of initial node 502. In the example of FIG. 5, the node 506 is a final node in a branch—the node 506 has no further connections to other nodes. Node 504, node 508, and node 510, however, go on to have flirt her layers of nodes connected to them. Node 504 is part of branch 512. Node 506 is part of branch 514. Node 508 is part of branch 516. Node 510 is part of branch 518. Any number of nodes may generally be included in each branch. Branches may have sub-branches, as shown in FIG. 5, such that each branch may have multiple final nodes. For example, the branch 512 includes final nodes L1, L2, and L3. The branch 514 includes final node 506. The branch 516 includes final nodes L5, L6, and L7. The branch 518 includes final nodes L8, L9, L10, L11, L12, L13, and L14. FIG. 5 is an example of a morphologically-adaptive coding network. Other examples may generally have any structure, including any number of starting nodes, any number of nodes in each layer, any number of final nodes, and any number of branches and nodes per branch.

The node 502 may be implemented, for example, using the node 200 of FIG. 2 in some examples.

Note that the number of nodes per branch (or sub-branch) may not be uniform. For example, there may be a variable number of nodes between an initial node and each final node. Reviewing FIG. 5, note there are three nodes between initial node 502 and final node L1. There is only a single node in the path between node 502 and final node L4. There are six nodes between the initial node 502 and final node L8. Accordingly, morphologically-adaptive coding networks described herein may not have uniform branch lengths. Rather, the nodes may be arranged such that a probability of arriving at each of the end nodes may be uniform and/or within a range of one another.

Accordingly, to begin development of a morphologically-adaptive coding network, an initial node may be provided. In some examples, multiple initial nodes may be used in parallel. Each node may have multiple hillocks. A hillock refers to a possible direction for formation of a next layer node.

As the morphologically-adaptive coding network develops, probability of visiting the ending leaves converges to an equal distribution. For example, referring to the example of FIG. 5, the probability of reaching node L1 may be given as P(L1). Mathematically, then, morphologically-adaptive coding network 500 is developed such that $P(L1)=P(L2)= \ldots =P(Ln)*1/n$ for n end leaves of the morphologically-adaptive coding network 500. Accordingly, given n ending nodes, the probability of reaching the node may be 1/n. Accordingly, even though input data (e.g., signal patterns) applied to the morphologically-adaptive coding network 500 and their convolutional signal features may have varying probabilities of occurrence, convergence of end node probabilities to 1/n where n is the number of ending nodes may provide optimal encoding in terms of memory used and loss rate of signal encoded with the morphologically-adaptive coding network 500.

Generally, then $P(a_0| \ldots | a_2| a_1| a_0)$ may represent a visiting or stimulation probability of a node (e.g., leaf) that is equal to others in the same level and is equal to $P(a_1|a_0) \times P(a_2|a_1) \times \ldots \times P(a_n|a_{n-1})$. When equal thresholds are used for the hillock adaptation and new connection to sub layers, then tire network tree size may be convergent if the stimulating events are from the same or similar physical environment.

Examples of morphologically-adaptive coding networks described herein may regulate the visiting frequency distribution at their set of ending nodes. Recall ending nodes are stimulated so that if the intensity is higher than the others, they cause hillocks in the region to be converted in to children connections. Hence energy distribution may be regulated. In this manner, nodes having a greater frequency of stimulation (e.g., visitation by spectral components of input data) are probabilistically expected to have more child nodes created than other regions.

Although equal probabilistic frequency distribution occurs in the ending layers of morphologically-adaptive coding networks described herein, they can be extended to a same level by adding zero components (e.g., nodes). In some examples, indexing may be performed with respect to distribution of the ending leaves at different layers. If a minimum maturity threshold is applied on an m-layer network, then index numbers can be constructed linearly. If modulatory inputs are not used, then subnetworks may arise in a feedforward structure. Parental connections may be used for unification of nodes when they come close to neighbors blow a threshold distance. When a data stream or signal sequence is applied to a trained network, visited index numbers sequence may represent the encoded data and network connection structure in terms of nodes and their features (e.g., hillocks and/or children) represent the template data. The same template data can be used for encoding and decoding of similar type of data (music, speech, image etc.).

When hillocks are randomly initiated and nodes are adapted and a morphologically-adapted coding network is morphologically developed using minimum energy dissipation criteria and energy accumulation based on a distance rate with respect to convolutional un-matching rate (e.g., convolutional impedance) or spectral un-matching (e.g., spectral impedance) rate in given time window, then the visiting probability of the network's ending nodes may converge to uniform distribution although input signal distribution may have different probabilistic and conditional distribution characteristics. Hence beat oriented adaptation of nodes and morphologically developed coding networks may provide both highest thermodynamically defined entropy as well as highest entropy of information. This may yield morphologically-adaptive circuits that may optimally encode applied signals.

When signals having non-uniform and time, event or space dependent conditional probability are applied to morphologically-adapted coding networks described herein, distribution of the output connections' visiting rates may converge to a uniform probability distribution, where morphological adaptation and network circuitry development are directed with respect to minimum heat energy depending on convolutional distance or spectral distance in given mode time windows. Hence, the optimal encoding cortex type network provides the highest entropy.

Accordingly, the heat oriented adaptation of nodes and morphologically developed circuits may provide both the highest thermodynamically defined entropy and the highest entropy of information, thereby yielding morphologically adaptive circuit optimally encoding the applied signals in a cortex system. For example, the optimal encoding cortex type network may provide the highest entropy.

Note that since biomimetic codecs described herein may utilise pro-trained morphologically-adaptive coding networks, noisy or lossy signal patterns may be corrected with respect to learned possible patterns construction maps. Hence noisy or lossy signals may be recovered during encoding of the data.

Construction of morphologically-adapted coding networks based on common relational features of short term memory within a sensory time windows may include medium term memory as abstracts, and time independent, sequence-dependent, or ordered, relationships as context. In some examples, an original set of external signals or physical input that are longer than the input sensitivity time window may provide probabilistic networking that homogenizes a spatial distribution of temperature in the processing cortex (e.g., distributing the heat equally over the whole cortex). In this manner, morphological development and adaptation of coding networks may provide maximum entropy encoding of input in time and space with respect to probabilistic distribution of interacting ambient physical objects or applied signals. The biomimetic encoder utilizing cortex(es) can provide minimum bandwidth communication and minimum total memory for large quantity of data or information when the connectomes are synchronised among multiple processing units.

Accordingly, biomimetic encoders and/or morphologically-adaptive coding networks described herein including cortex(es) can provide minimum bandwidth communication and minimum total memory for large quantity of data or information when the connectomes are synchronized among multiple processing units.

In some examples, entropy maximization of signal processing by having reference to conducting nodes within the morphologically-adaptive coding network may also provide input signal related external object or origin of the signal related classifications since the internal circuit ways distribution of the information flow for applied signal sequences represents the decomposed features of the information or physical objects that constitutes those input signal sequences. Accordingly, entropy may be maximized during signal processing using examples described herein.

Accordingly, examples of biomimetic codecs described herein may apply input signals to one or more morphologically-adaptive coding networks. When a signal is applied to a network described herein, one or more nodes in the input layer may frame the signal (e.g., using framing block 302 of FIG. 3). Framing may be associated with equivalent cell size of the input layer nodes and may determine the sensitivity range to variation the input signal. For example, if there is one input signal and one input node then with respect to time constant of the node, 4, 8, 16, 32 or 64 sample values of the input signal may be framed. In an example where the frame size is 4 then a mathematical distance of 4 sampling value stream may be calculated either with respect to convolutional matching rate of the input node and its children values (subnodes) or spectral distribution matching rate as an analogy to circuit impedance. In some examples, a wavelet transform may be used. In the example of 4 sampling values, 4 samplings may yield 4 wavelet coefficients, which may be expressed as a0, a1, a2, a3.

Nodes may also have children (e.g., connected nodes at a next layer) which may keep the values as a0', a1', a2', a3'. For example, there may be one a0 that is the first wavelet coefficient of the framed signal but there may be multiple a0's represented by children of the first node. In an example, foe signal's wavelet transformation is [a0 a1 a2 a3]=[3, −1, 2, 5] and the closest 4 step route through foe network may be is [3, 0, 2, 4] then the inverse wavelet transform of [3, 0, 2, 4] is a time domain signal and its difference with respect to the original signal at 4 sampling points may provide an error that may be referred to as "heat" that may prompt adaptation of the morphologically-adaptive coding network.

In another example, if the leaf number=3→0→2→4 is 100 then foe frame may be coded as 100. Multiple leaves can also be stimulated with respect to their matching rate if similarity to a leaf index is not dominant. For example if it is matching more than 93% (or some other threshold) to a particular leaf, e.g., leaf 100, then the frame may be represented by leaf 100. On foe other hand if 60% of the framed information flows (similarity) through leaf 100 and 33% flows through leaf 150 then weights may be used associated with 0.6 of leaf 100 and 0.35 of leaf 150 as 95% representation of the original signal.

Framed signal sequences may then be converted to leaf number sequences. If the frame size is 32 samples and foe nearest 93% representing leaf number is a 32 bits integer number then 16 bits of 32 samplings can be represented by 32 bits single integer number, for example. Hence 16×32/32=16 times of compression becomes possible with 5% loss rate. On the other hand as long as similar songs are played during training, a cortex may be developed so that the similarity rate will be increased above 95%. Meanwhile, even though repetition rate of a series of input signal may not be caught by the time-window frame there are three additional options for catching foe relations and recording the input signal patterns with minimum variable information in some examples. The first is there may be multiple input connections with different time frames. For example 16 and 32 sample size windows can be sharing the same signal. They dune energy of the signal with respect highest equivalent similarity rate in their preceding networks. Hence if this similarity of the represented signal and the input signal is convened into heat then representing leaf numbers also cause minimum energy dissipating network transitions. As a second kind of action, adaptation of existing children of the nodes with respect to use rate of the same circuit of the network may reduce the error as well as it may cause new branches in training mode. An example sequence of leaf numbers as 100, 150, 100, 323, 430, 44 . . . etc can be applied to another network called an abstract network. The abstract network may accept variations of leaf numbers where each of them represents a framed signal. If the abstract network represents 80% of the original signal with another 4× compression in addition to 16× compression performance in the given example then total compression rate becomes 64×. Although the error rate of the represented signal may be 4 times in increased (5% to 20%) since 80% of the signal patterns encoded ×1/64 of the original, the remaining part can be re-encoded by the same type of another network as error recovery.

In some examples, when the network parameters are adjusted so that the quality of audio signal recovery is same as MP3 (e.g., 196 kbps), an index file of leaves as compressed record may have a much shorter file sire. Typically the saving rate with respect to conventional multimedia data compression methods is 35%→70% depending on the coding network development rate (e.g., cortex size). It should be considered that morphologically-adaptive coding networks described herein may be represented as a common file including codices. If the amount of multimedia files are in 1000s level then application of methods described herein may not only greatly save overall memory, but also it may reduce red time communication bandwidth in transfer of the files as broadcast, multicast, two way isochronous communication or downloads. Moreover, if the compression rate is reduced down around to conventional MP3 (e.g., 196 kbps) then the encode-decode signal recovery performance using methods described herein can catch near CD quality playback performance.

Figure 6:
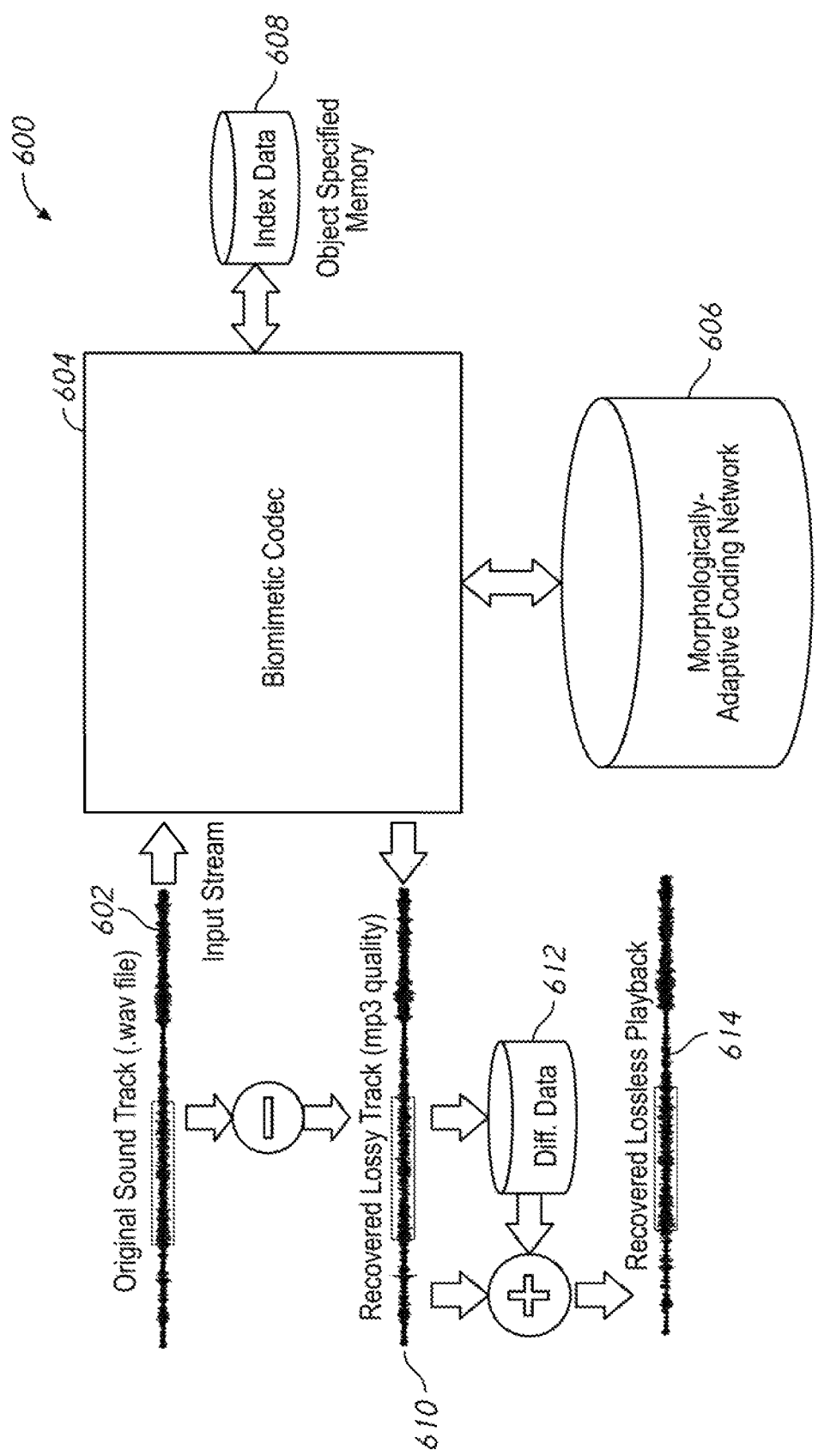
FIG. 6 is a schematic illustration of a system arranged in accordance with examples described herein.

FIG. 6 is a schematic illustration of a system arranged in accordance with examples described herein. The system 600 includes input data 602, biomimetic codec 604, morphologically-adaptive coding network 606, compressed data 609, recovered data 610, differential data 612, and recovered lossless data 614. Additional, fewer, and/or different components may be used in other examples. The system 100 of FIG. 1 may be used to implement the system 600 of FIG. 6 in some examples.

In the example of FIG. 6, a biomimetic codec 604 may receive input data 602. The input data 602 may be, for example, a sound track, such as a .wav file. Other types of input data and/or file formats may be used as input data 602 in other examples.

The biomimetic codec 604 may encode the input data 602 using morphologically-adaptive coding network 606 as described herein. In some examples, the morphologically-adaptive coding network 606 may be particular to the type of input data 602 and/or environment from which input data 602 was obtained.

Encoding the input data 602 using morphologically-adaptive coding network 606 may result in compressed data 609. For example, the compressed data 609 may include an index of final nodes of the morphologically-adaptive coding network 606 visited by the input data 602 when the input data 602 was applied to the morphologically-adaptive coding network 606 by the biomimetic codec 604. Accordingly, the compressed data 609 may correspond with the input data 602, but may be smaller in size than the input data 602. The compressed dam 609 may be stored (e.g., in memory and/or other electronic storage). The compressed data 608 may represent features of the biomimetic codec 102 encoded with respect to morphologically-adaptive coding network 606 (e.g., a template). The compressed data 608 may include an index of visited leaves of the last layer of the morphologically-adaptive coding network 606, and the compressed data 608 may be referred to as a .bic format.

The biomimetic codec 604 may decode the compressed data 608 using the morphologically-adaptive coding network 606. Decoding the compressed data 608 may result in recovered data 610. The recovered data 610 may be lossy compared with input data 602. For example, the recovered data 610 may be an approximation of input data 602. In some examples, the recovered data 610 may, for example, be of similar quality (e.g., loss level) as an .mp3 file.

In some examples, the biomimetic codec 604 may additional provide differential data 612 pertaining to a difference between input data 602 and recovered data 610. The differential data 612 may, for example, be generated during encoding and stored. For example, the differential data 612 may be stored with the compressed data 608 in some examples. By combining the differential data 612 and the compressed data 608, recovered lossless data 614 may be obtained. This may allow for lossless playback of input data (e.g., audio files).

The morphologically-adaptive coding network 606 may be generated as described herein, utilizing an energy minimization/entropy maximization methodology to provide a convergent morphologically-adaptive coding network 606 where ending nodes have queryable properties. Such a morphologically-adaptive coding network 606 may allow for fusion between different types of signal patterns as a common feature of new learning objects. For example, a sound of a stick hit on a drum and its image properties may be expected to be received simultaneously, and the relationship between the audio and image properties may be utilized in morphologically-adaptive coding network 606.

Accordingly, different from conventional signal and data coding systems, morphologically developed coding networks described herein may not only facilitate maximum entropy encoding but also may provide queryable information through additional encoding of visited branches or leaves by the same type of cascaded cortex or conventional classification methods such as neural networks and logistic regression. The analytic functions for additional decision or additional encoding via other types of input and cortices may not require decoding into raw signal or data form.

While a single morphologically-adaptive coding network 606 is shown in FIG. 6, multiple morphologically-adaptive coding networks may be used and may be cascaded (e.g., connected in series and/or parallel). When variation ending nodes from one morphologically-adaptive coding network are applied to a next morphologically-adaptive coding network, then cognitive sensing time may be enlarged. For example, if a sound track is sampled at 20 kHz (e.g., with a sampling period if 50 μs), if the input layer time frame is 500 μs, then there may be 10 samples in each frame and the subnetwork may have 10 layers for typical decomposition. When another group of nodes are cascaded and visited hillock indices of the last layer are converted into another signal patient and applied to the next network, then time frame expands while keeping the high frequency details in the first group. Hence encoding and decoding time may increase in an alternative way by increasing the time interval instead of sequencing the frames. For example, 50 μs, 500 μs, 5 ms, 50 ms, 500 ms, 5s, 50s, 250s may be reached in ×10 expansions of 8 cascaded coding networks.

A learning object may generally include a repetitive set of common features. Although the teaming objects' relevant signal patterns may have different probability of occurrences, their features stimulating the sensory inputs may be decomposed into equally probable components in morphologically-adaptive coding networks described herein. The coding network may be convergent so that the encoded form of the data includes an equally probable sub-features set. Examples of biomimetic codecs described herein may encode multi-dimensional signal pattern features in an object oriented manner, which may increase the compression efficiency. When a new pattern applied, it may be connected to the closest existing features related part of the coding network.

Accordingly, in some examples, by sharing the most updated trained cortex structural information through communication networks as a sort of cloud service or embedding that information into devices, rapid initiation of untrained systems for high performance encode and decode operations may be achieved.

Figure 7:
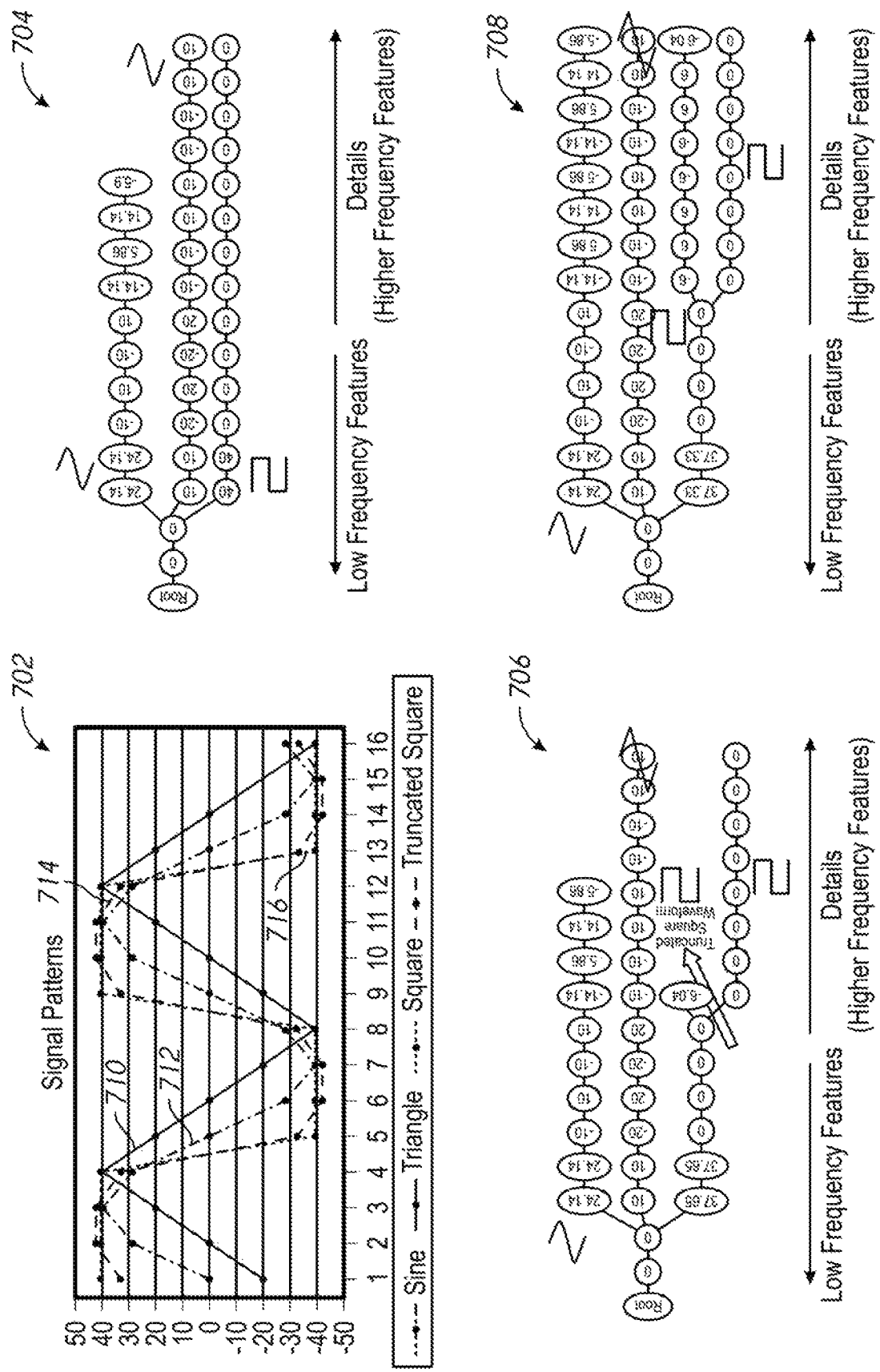
FIG. 7 is a schematic illustration of morphologically-adaptive coding networks arranged in accordance with examples described herein.

FIG. 7 is a schematic illustration of morphologically-adaptive coding networks arranged in accordance with examples described herein. FIG. 7 illustrates coding networks which may be trained for a variety of signal patterns 702. The signal patterns 702 include a triangle wave 710, sine wave 712, truncated square wave 714, and square wave 716. Additional, fewer, and/or different signal patterns may be used in other examples. The morphologically-adaptive coding networks shown in FIG. 7 may be used to implement any of the morphologically-adaptive coding networks described herein.

The network 704 is a morphologically-adaptive coding network illustrated after being trained by a sine wave 712 after training with a square wave 716 and triangle wave 710. Training by the square wave 716 may result in a branch of the network 704, illustrated as a bottom branch in FIG. 7. Training by the triangle wave 710 may result in a branch of the network 704, illustrated as a middle branch in FIG. 7. Subsequent training with the sine wave 712 may result in another branch of the network 704, illustrated as an upper branch in FIG. 7.

The network 706 is the network 704 after further training using a truncated square wave 714. When the truncated square wave 714 is applied to the network 704, its features may begin to be decomposed similar to the square wave 716, and then a sob-branch may be formed from the branch associated with the square wave 716. In this manner, the development of morphologically-adaptive coding networks described herein may be influenced by previous training. New signal patterns may be represented in the morphologically-adaptive coding network using sub-branches of previous, similar branches.

Generally, if visited leaves of a branch become closer below a certain limit in tune during training, then in some examples, the ancestor connection can be unified and this may reduce the complexity of the morphologically-adaptive coding network.

In some examples, training the coding networks with a particular kind of data (e.g., audio or video) may reduce its development speed in larger amount of iterations and with different type of content so it b convergent in terms of template size. The trained template can be shared and used for encoding and decoding the content with an increased amount of relational common features and so an increased compression efficiency within predefined latency.

When a fixed and pretrained morphologically-adaptive coding network (e.g., template) is used, different layer of details may be transferred and processed with respect to network, processor (e.g. CPU) and the memory availability. Therefore, deeper layers may be used when network, bandwidth is satisfactory, or longer abstracts may be used when memory is satisfactory. Since the same template may be used in different ways, dynamically balancing the resources in accordance with a predefined management policy b possible.

In some examples, cross correlation between different types of encoded data may be used. In this manner, some repetitively intersecting features in different types of input data—e.g., a sound track and one or more video images—causes interconnection between input groups at different frequency intervals. For example, a sound of a drum synchronized with the hitting sticks on the image may be coupled in abstract layers. This may both increase coding performance and provide queryable relationships between the stick hit tempo and the dram in some examples.

Training (hiring encoding may be used in some examples. Accordingly, encoding and decoding of compressed data described herein over pretrained templates may have fixed latency for a same amount of hardware availability. In this manner, optimizing the quality of the content over different networks having variable connection bandwidths become manageable.

In some examples, the adaptive bandwidth consumption, based on availability of physical bandwidth, may be a desirable property. Since the probabilistic properties of signals may be hierarchically structured in layers within morphologically adapted and developed coding networks, getting the information from a shallow level still may maintain rough features, and this causes only loss while the more detailed features are kept in deeper levels. Cortex networks may encode and decode signal patterns representing the multimedia data using less details when network bandwidth is reduced due to traffic or physical restrictions.

Accordingly, in some examples, encoding and/or decoding may be uninterrupted in isochronous communication networks but quality may be optimized with respect to varying communication bandwidth availability.

In some examples, a same morphologically-adaptive coding network may be used at different depths depending on processing power, memory and/or energy restrictions of the hardware used to implement the coding. For example, referring back to FIG. 1, in a resource constrained environment, the biomimetic codec 102 may utilize only a portion of the morphologically-adaptive coding network 104. For example, if available processing power is below a threshold, if memory is below a threshold, and/or if a power budget for the biomimetic codec 102 is below a threshold, the biomimetic codec 102 may utilize less than all of the morphologically-adaptive coding network 104 to encode biomimetic codec 102. Accordingly, in some examples a same morphologically-adaptive coding network 104 may be distributed to multiple devices which may utilize the morphologically-adaptive coding network 104 differently. When the biomimetic codec 102 is operating on a high performance computing system, it may utilize a greater amount of morphologically-adaptive coding network 104 than when the biomimetic codec 102 is operating on a mobile device, for example.

After encoding using morphologically-adaptive coding networks described herein, recover of the input data (and/or an approximation of the input data) may be performed. Generally, decoding may occur in a variety of ways. In some examples, back conversion may be used, and the data may be decoded using the morphologically-adaptive coding network which had been used to encode the data, but using the morphologically-adaptive coding network in a reverse direction (e.g., by mathematically inversing the operations of the morphologically-adaptive coding network).

In some examples, forward mimicking may be used. Forward mimicking may include training of a playback, movement, actuation and/or a visualization system so that the input data or signal patterns can be equalized.

Figure 8:
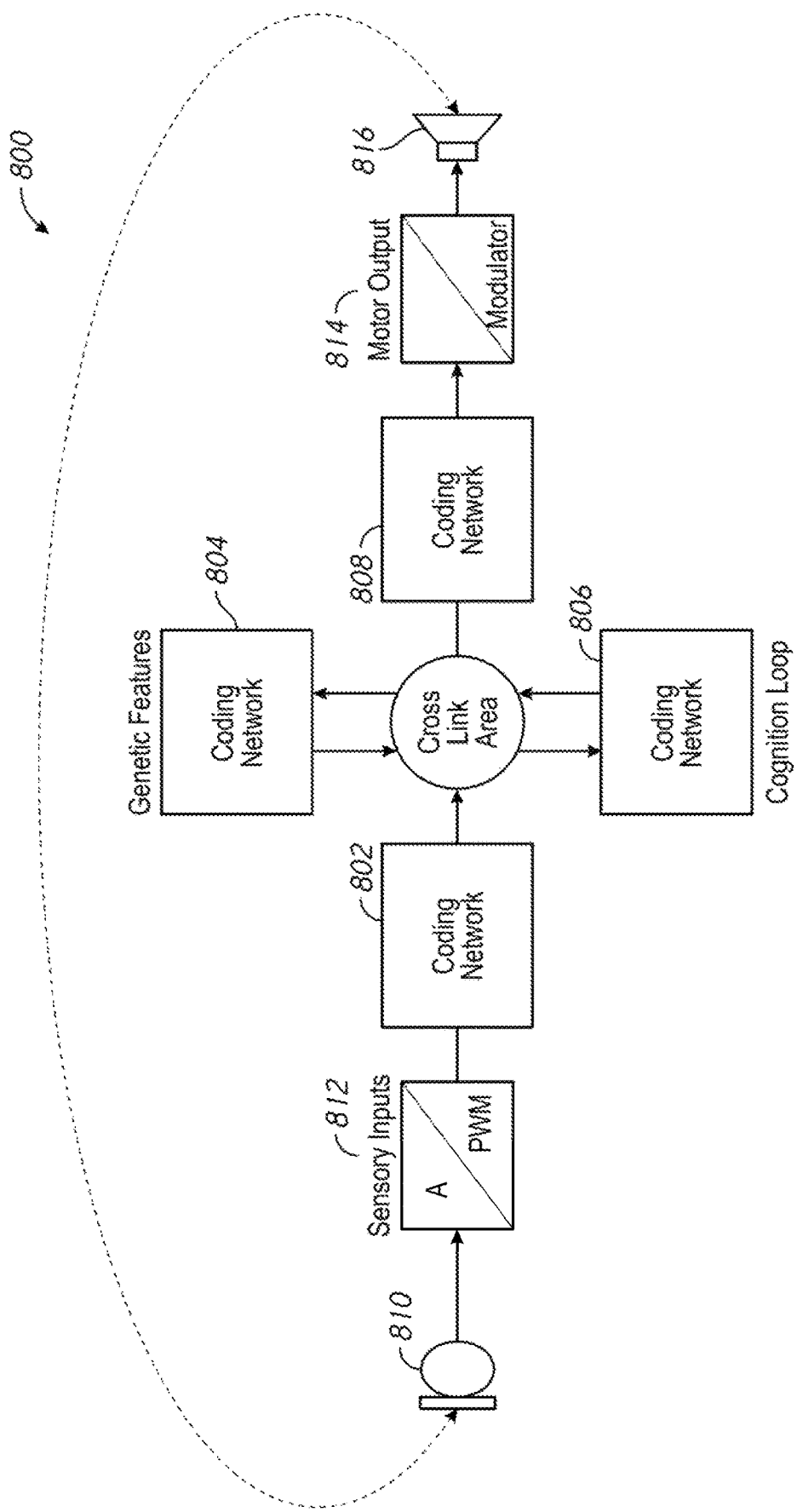
FIG. 8 is a schematic illustration of a system arranged in accordance with examples described herein.

FIG. 8 is a schematic illustration of a system arranged in accordance with examples described herein. The example of FIG. 8 illustrates and example where input data representative of sound is encoded and recovered through a forward mimicking process. The system 800 includes multiple coding networks—coding network 802, coding network 804, coding network 806, and coding network 808, microphone 810, modulator 812, modulator 814, and speaker 816. The coding networks of FIG. 8 may be morphologically-adaptive coding networks as described herein. While four coding networks are shown in FIG. 8, any number may be used in other examples. The coding networks may be interconnected with one another (e.g., cascaded).

Input data may be provided from one or mote sensors. For example, microphone 810 may be used to provide input data representative of audio information. Other sensors may be used in other examples, and any number may be used. In some examples, sensors may not be present, and input data may be retrieved from electronic storage (e.g., memory).

An input modulator 812 may be provided to modulate input data (e.g., input signals). Generally, any type of modulation and/or other signal conditioning may be used, including, but not limited to, pulse-width modulation, amplification, and/or analog-to-digital conversion.

The modulated input data may be provided to the combination of coding networks, including coding network 802, coding network 804, coding network 806, and coding network 808. In the example of FIG. 8, the coding network 802, coding network 804, coding network 806, and coding networks 808 are coupled using a cross-link area which may provide outputs of one or more of the coding networks as inputs to one or more others of the coding networks. One or more biomimetic codecs may utilize the combination of coding networks to encode the modulated input data.

After encoding, the encoded data may be provided to an output modulator 814. Generally, any type of modulation and/or other signal conditioning may be used, including but not limited to, pulse-width demodulation, amplification, and/or digital-to-analog conversion. In some examples, the output modulator 814 may provide generally inverse functions to modulation performed by the input modulator 812.

The modulator 814 may provide output signals to one or more actuators, such as speaker 816. Other actuators may be used in other examples, including, but not limited to, one or more displays and/or tactile actuators.

The output of the actuators may be fed-forward to the sensors and used to train the coding networks such that the output and input of the system 800 may be equalized.

Accordingly, during operation, signals may be provided from the microphone 810 and may be encoded using biomimetic codecs and encoding techniques described herein. The encoded data may be recovered through the feedforward speaker driving network shown in FIG. 8. The coding networks of FIG. 8 may be trained to equalize the inputs and outputs of the system shown in FIG. 8. The coding networks may be switched between a training (e.g., equalization) and playback modes. Once the coding networks had been trained to equalize the input and output of the system 800, the coding networks may be used m a playback mode to playback subsequent input received.

Back conversion may generally be used for decoding in computational platforms having digital playback abilities. Feedforward mimicking may generally be used when there is specific device or instrument, e.g., a synthetic throat and/or a musical instrument.

Figure 9:
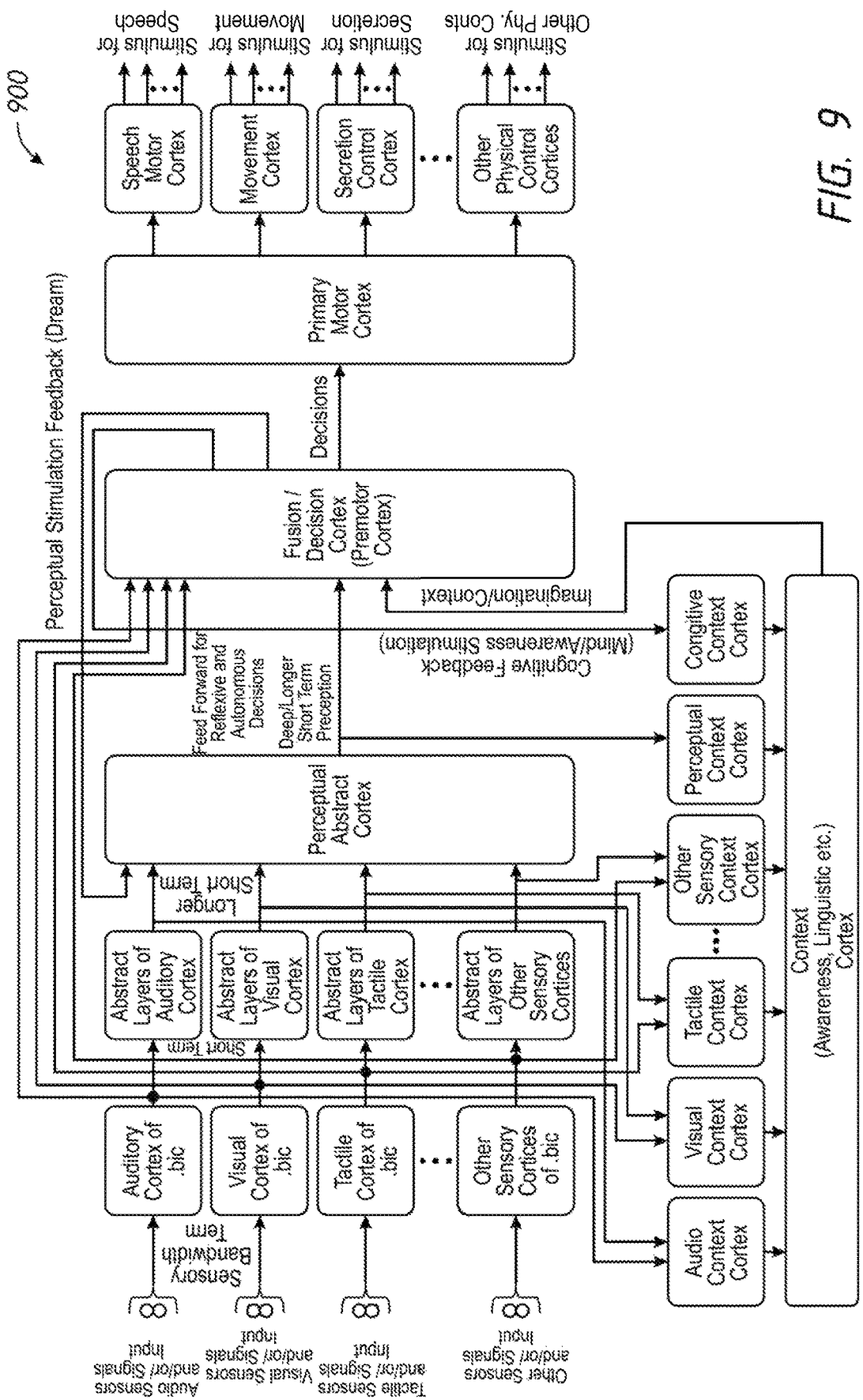
FIG. 9 is a schematic illustration of a system arranged in accordance with examples described herein.

FIG. 9 is a schematic illustration of a system arranged in accordance with examples described herein. The system 900 includes use of multiple biomimetic codecs described herein, each of which may use morphologically-adaptive coding networks described herein. The biomimetic codecs ere referred to as "cortexes" in the example of FIG. 9. By arranging multiple cortices, brain-like computing may be achieved.

In some examples, as input data is applied to a morphologically-adapted coding network, the input data may visit certain leaves in the network, or in leaves of a cascaded network. Visitation of certain leaves may stimulate another cortex (e.g., another network) in an event triggered model in some examples instead of or in addition to the use of time window sensitivity. Accordingly, correlation of the repetition rate of some signal pattern features or abstract signal pattern features may facilitate construction of a context cortex. In some examples, a context cortex may provide signal outputs that may be out of a perceptual time window of abstract and sensory cortices. In this manner, a higher level of entropy may be provided in compression and other cognitive functions.

In some examples, a fusion-type biomimetic encoder may be used. The fusion-type biomimetic encodes may convolve input signal patterns, abstracted signals and the context cortex outputs to provide encoding to keep information and decisions for minimum energy dissipation.

In some examples, an inverse transform of the signals starting from last leaf in an abstracted biomimetic codec system or index of digitally recorded leaf sequences of sensory cortex may facilitate recovery of the original signal. In some examples, the loss level can be reduced to a desired level by previously coding the error as the difference between the original signal and foe recovered signal.

In some examples, a biomimetic codec system may be provided which may be referred to as a motor cortex. The motor cortex may include a morphologically-adaptive coding network which may be coupled between an actuator and a fusion cortex. The motor cortex may in some examples equalize playback of patterns driven though the actuator and feedback from sensory inputs. Accordingly, this may provide another mechanism of signal decoding. In some examples, the motor cortex may be pre-trained before real time encoding and playback performance of signals from the same physical environment. In this manner, a brain-inspired method of memory playback becomes possible such as playback through an inductive speaker, piezo speaker or a synthetic throat mechanism with respect to signals encoded from capacitive microphone or a synthetic ear.

In examples using multiple cortices, combinational change of the cortices may provide input to an additional cortex (e.g., a fusion cortex) for additional relational encoding. In this manner, the relationship between different cortices itself may become context that may be used to raise entropy to improve coding and/or provide a higher compression rate in some examples.

In some examples, typical sensory inputs such as audio from song, ambient noise, voice, and/or other source, may cause construction of a morphologically-adaptive coding network that may converge to statistical histogram functions. Initiation of the sensory system with respect to those functional representations may in some examples speed up the training process and in some examples it can even be used for reducing the memory in computational platforms or space complexity of embedded implementations.

A variety of types of encoding may be performed using encoding techniques described herein. The types may be cascaded (e.g., coupled) together to provide encoding that utilizes multiple techniques.

In some examples, sensor perception coding may be performed. Convolutional features may be encoded space or time (e.g., temporal for audio, spatial for image, spatio temporal for video). Energy dissipation may be used as a penalty function for minimization during reinforcement learning to form a morphologically-adaptive coding network. Adaptive histogram coding may be an alternative to encoding layer. A goal of this layer may be optimal encoding of sensory signals with respect to signal-to-noise ratio (SNR) referred probabilistic rate of patterns. The input time interval used may be a sensory time frame such as 10 Hz=100 ms in some examples to 10.000 Hz=0.1 ms in some examples. Other time frames and/or ranges may also be used.

Accordingly, the space complexity in some examples can be reduced in emulation of morphologically adapted coding networks in digital computer computational platforms resulting in less memory used for encode and decode in reel trine computational process in devices that have restricted resources as the mobile devices.

In some examples, abstract encoding may be performed. Abstract encoding may be based on energy dissipation of convolution features applied from an output of the sensory perception coding layer. The output may be correlated to a time frame which is 10 to 100 times the lime frame of the sensory perception encoding layer. For example, 1 Hz=1s to 0.1 Hz=10s in some examples. Accordingly, the abstract encoding layer may be associated with short term memory (e.g., using a time constant of 1 to 10 seconds).

In some examples, context encoding may be performed. Context encoding may be based on energy dissipation of convolution features applied from an output of the sensory perception coding layer. A different morphologically-adaptive coding network may be used to perform context encoding than used to perform abstract encoding. The output of the context encoding may be correlated with a sequential relationship of events as a combinational Junction of sensory inputs. Accordingly, the context encoding layer may be associated with long term memory.

In some examples, a motor cortex may be used. The fusion cortex may combine outputs of the sensory perception encoding, abstract encoding, context encoding, and feedback in some examples. Output may include a set of multidimensional wavelet coefficients.

In some examples, a motor cortex may be used to provide action. A decision, e.g., made by the fusion cortex, may be converted into a physical activation (e.g., speaker output, visual output, auditory output, tactile output). The physical activation may be associated with the previous input data.

Accordingly, reinforcement learning via minimum dissipated energy directed adaptation and morphological structuring of nodes in accordance with examples described herein may yield maximum entropy encoding of probabilistically distributed input signal patterns.

Generally, the short term space complexity of a processing system may be minimized in accordance with examples described herein while longer term cognitive functions are enabled.

Accordingly, cortices may be provided which may include morphologically-adaptive coding networks described herein, which may be adapted with respect to minimum energy dissipation, depending on distance of convolutional features or spectral features in different time frames. The cortices may in some examples not only provide maximum entropy for information coding but they also enable recovery, regeneration and decision making. When similar types of cortices are used to construct a network as shown in FIG. 9, while each of the cortex groups may satisfy a minimum dissipated energy principle, minimizing overall heal of the system may be occur by making decisions in interaction with the physical world. Sensory cortices such as an auditory cortex may optimally encode the signal or sequence of data. An abstract layer cortices may encode a class in larger time windows. Context cortices may encode foe abstracts and output of the sensory cortex as sequences of events in a way that is more independent from time. So conditional probability of series of some events may be recognized as context. Different types of sensory signal abstracts may provide a multidimensional perception. Perception abstract, specific sensory cortex output together with the context may be used for extracting decisions that also minimize probability of receiving the sensory inputs that increases the heat energy as dissipation. Modulatory type encoders may be used for signal or data fining in order to make decisions. Three types of outputs may be provided from premotor cortex where decisions are made. The first group may stimulate a primary cortex. The primary cortex may encode foe information as sort of replication with respect to similarity of the actions from the own sensory networks. The primary cortex may be trained through simple replications as driving foe speech cortex until the same type of sound related encoded information from sensory and abstract cortices are received. Outputs of the primary cortex are linked to relevant drivers for different physical actuations such as speech cortex. The speech cortex may convert signals from foe primary cortex into vibrations that drives an electronic speaker or a synthetic throat so that foe decided action relevant voice can be sounded and equalized in fusion layer. A second group of decisions may include a virtual context mind or awareness. For example, if you think of a number in short term to make another calculation on that or if you consider where you are so that you can make the decision for next turn, these are analogous to sorts of awareness or mind as a part of decision. Another feedback line from the decision cortex is perceptual stimulation. For example, you may not only mind a thought but virtual perception is also possible. For example when someone imagines a song in mind, it can be as close as it is real but he cannot generate that song thorough motor cortex layers.

The connectome system consisting or biomimetic coding cortices, that makes decisions by fusing context and the perceptions, not only minimizes energy dissipation of each unit in terms of beat, but it also globally reduces the dissipation of the whole connectome that corresponds to the best way of actions in accordance with the physical response of the existing real peripheral world. This system optimally encodes and processes the information.

Reinforcement learning via minimum dissipated energy directed adaptation and morphological structuring of nodes may yield maximum entropy encoding of probabilistically distributed input signal pattern. The short term space complexity of a processing system may be minimized while longer term cognitive functions are enabled.

Network constructions based on common relational lea totes of short term memory within sensory time windows may include medium term memory as abstracts, and time independent, sequence-dependent, or ordered, relationships as context. Therefore, original set of external signals or physical input that are longer than the input sensitivity time window enables probabilistic networking that homogenizes spatial distribution of temperature in the processing cortex (e.g., distributing the heat equally over the whole cortex). This manner of morphological development and adaptation of signal processing network may provide maximum entropy encoding of input in time and space with respect to probabilistic distribution of unending ambient physical objects or applied signals. The networks of the system including cortex(es) can provide minimum bandwidth communication and minimum total memory for large quantity of data or information when the connectomes are synchronized among multiple processing units.

Figure 10:
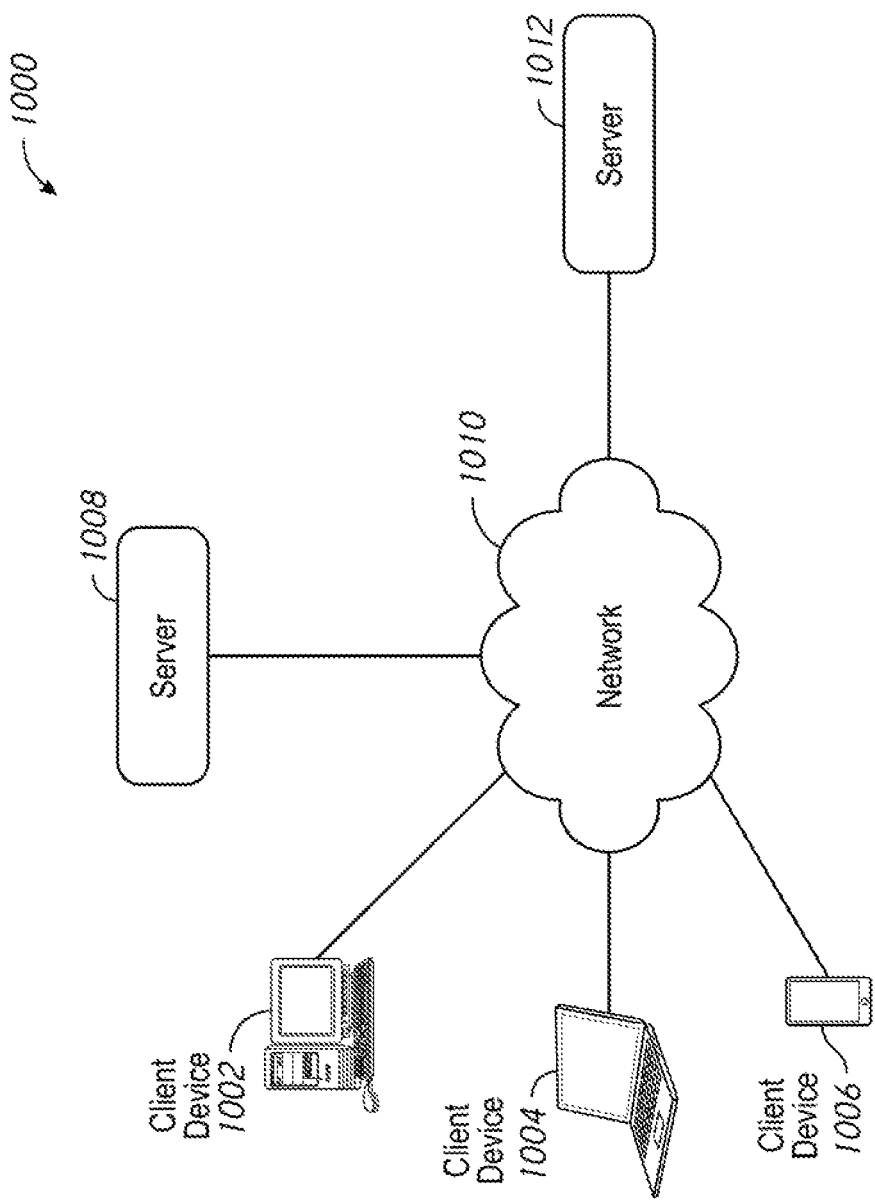
FIG. 10 is a block diagram of at example computing network arranged in accordance with examples described herein.

FIG. 10 is a block diagram of an example computing network arranged in accordance with examples described herein. In the example computing network 1000 of FIG. 10, servers 1008 and 1012 are configured to communicate, via a network 1010, with client devices 1002, 1004, and 1006. As shown in FIG. 10, client devices can include a personal computer 1002, a laptop computer 1004, and a smart-phone 1006. Mote generally, the client devices (or any additional client devices) can be any sort of computing device, such as a workstation, network terminal, desktop computer, laptop computer, wireless communication device (e.g., a cell phone or smart phone), and so on. Some or all of client devices can be a source or recipient of data encoded with a biomimetic codec as disclosed herein, as well as the device in which such a biomimetic codec is implemented or implemented in pan. The network 1010 can correspond to a local area network, a wide area network, a corporate intranet, the public Internet, combinations thereof, or any other type of networks) configured to provide communication between networked computing devices. In some embodiments, part or all of the communication between networked computing devices can be secured.

Servers 1008 and 1012 can share content and/or provide content to client devices 1002, 1004, 1006. As shown in FIG. 10, servers 1008 and 1012 are not physically at the same location. Alternatively, servers 1008 and 1012 can be co-located, and/or can be accessible via a network separate from network 1010. Although FIG. 10 shows three client devices and two servers, network 1010 can service more or fewer than three client devices and/or more or fewer than two servers. In some embodiments, servers 1008, 1012 can perform some or all of the herein-described methods.

Figure 11:
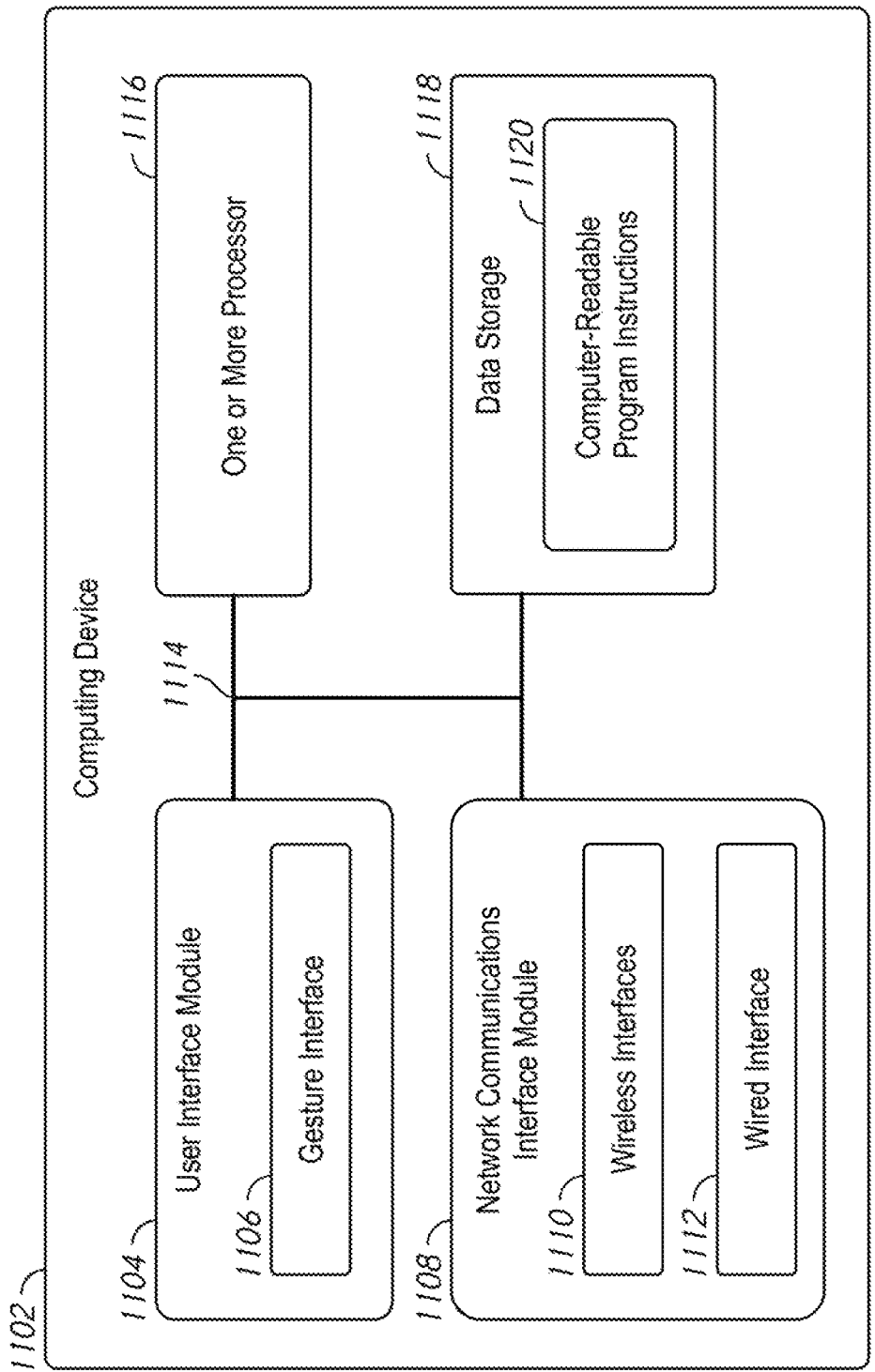
FIG. 11 is a block diagram of an example computing device arranged in accordance with examples described herein.

FIG. 11 is a block diagram of an example computing device arranged in accordance with examples described herein. The computing device 1102 includes user interface module 1104, network-communication interface module 1108, one or mote processors 1116, and data storage 1118.

Computing device 1102 shown in FIG. 11 can be configured to perform one or more functions of a system, biomimetic codec, them devices 1002, 1004, 1006, network 1010, and/or servers 1008, 1012 of FIG. 10. Computing device 1102 may include a user interface module 1104, a network-communication interface module 1108, one or more processors 1116, and data storage 1118, all of which may be linked together via a system bus, network, or other connection mechanism 1114.

Computing device 1102 can be a desktop computer, laptop or notebook computer, personal data assistant (PDA), mobile phone, video game console, embedded processor, touchless-enabled device, or any similar device that is equipped with at least one processing unit capable of executing machine-language instructions that implement at least port of the herein-described techniques and methods.

User interface 1104 can receive input and/or provide output, perhaps to a user. User interface 1104 can be configured to send and/or receive data to and/or from user input from input device(s), such as a keyboard, a keypad, a touch screen, a computer moose, a track ball, a joystick, camera, and/or other similar devices configured to receive input from a user of the computing device 1102. In some embodiments, input devices can include gesture-related devices, such a video input device, a motion input device, time-of-flight sensor, RGB camera, or other 3D input device. User interface 1104 can be configured to provide output to output display devices, such as one or more cathode ray tubes (CRTs), liquid crystal displays (LCDs), light emitting diodes (LEDs), displays using digital light processing (DLP) technology, printers, light bulbs, and/or other similar devices capable of displaying graphical, textual, and/or numerical information to a user of computing device 1102. User interface module 1104 can also be configured to generate audible output(s), such as a speaker, speaker jack, audio output port, audio output device, earphones, and/or other similar devices configured to convey sound and/or audible information to a user of computing device 1102. As shown in FIG. 11, user interface can be configured with gesture interface 1106 that can receive inputs related to gestures or other touchless, user-based motions and provide outputs such as visual feedback, haptic feedback, audible feedback, and/or other gesture-related outputs.

Network-communication interface module 1108 can be configured to send and receive data over wireless interface 1110 and/or wired interface 1112 via a network, such as network 1010. Wireless interface 1110 if present, can utilize an air interface, such as a Bluetooth®, Wi-Fi®, ZigBee®, and/or WiMAX™ interface to a data network, such as a wide area network (WAN), a local area network (LAN), one or mote public data networks (e.g., the Internet), one or more private data networks, or any combination of public and private data networks. Wired interface(s) 1112, if present, can comprise a wire, cable, fiber-optic link and/or similar physical connection(s) to a data network, such as a WAN, LAN, one or mote public data networks, one or more private data networks, or any combination of such networks.

In some embodiments, network-communication interface module 1108 can be configured to provide reliable, secured, and/or authenticated communications. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be wed as well as or in addition to (hose listed herein to secure (and then decrypt/decode) communications.

Processors) 1116 can include one or more central processing units, computer processors, mobile processors, digital signal processors (DSPs), microprocessors, computer chips, and/or other processing units configured to execute machine-language instructions and process data. Processor(s) 1116 can be configured to execute computer-readable program instructions 1120 that are contained in data storage 1118 and/or other instructions as described herein.

Data storage 1118 can include one or more physical and/or nan-transitory storage devices, such as read-only memory (ROM), random access memory (RAM), removable-disk-drive memory, hard-disk memory, magnetic-tape memory, flash memory, and/or other storage devices. Data storage 1118 can include one or more physical and/or non-transitory storage devices with at least enough combined storage capacity to contain computer-readable program instructions 1120 and any associated/related data structures.

Computer-readable program instructions 1120 and any data structures contained in data storage 1118 include computer-readable program instructions executable by processor(s) 1116 and any storage required, respectively, to perform at least part of herein-described methods.

Figure 12:
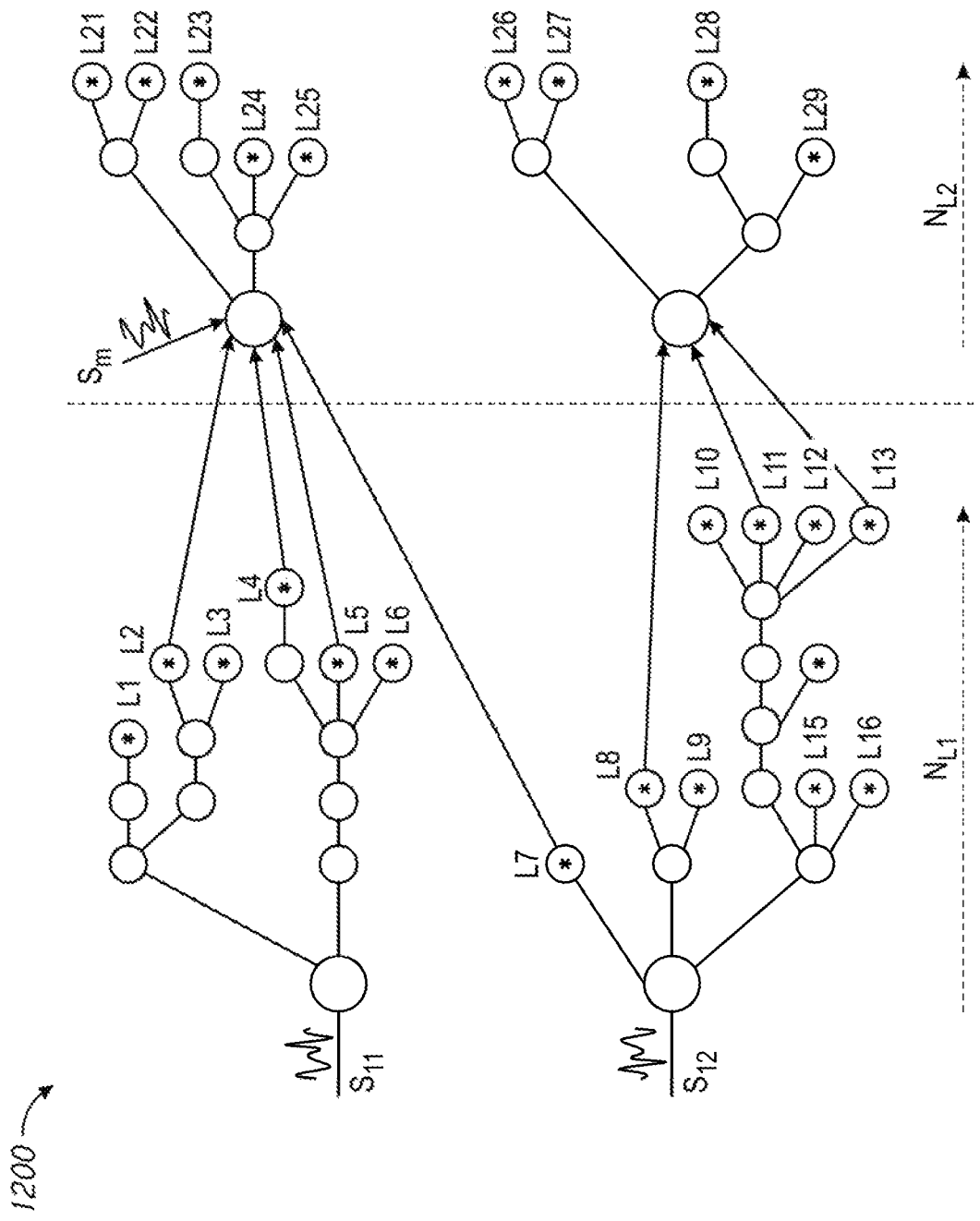
FIG. 12 is a schematic illustration of a morphologically-adaptive coding network arranged in accordance with examples described herein.

FIG. 12 is a schematic illustration of a morphologically-adaptive coding network arranged in accordance with examples described herein. The morphologically-adaptive coding network 1200 depicted in FIG. 12 may be spatially neighboring a cortex (e.g., NL1) that may be connected to multiple input signals such as Si1 and $S_{i2}$. Stimulation sequence of leaves L1, L2, . . . L16 with respect to content of $S_{i1}$ and $S_{i2}$ may be re-encoded by the network 1200 of FIG. 12 after encoding by a first network, such as the network of FIG. 5. The appended morphologically adaptive network of FIG. 12 may constitute a cortex such that uniform probability convergence can be provided as $P(L21) \approx PL(22) \approx \ldots \approx P(L29)$. Although the second cortex may also be developed in a similar manner with respect to convolutional or spectral distance measurement in given time window, said sensitivity time frame of the nodes, perceptional time represented by second cortex said abstract cortex may be much larger than the first one (e.g., than the network shown in FIG. 5).

Accordingly, in some examples, the abstract cortex outputs may facilitate classification of longer term input sequences as well as context development for deeper level additional cortex connections.

Figure 13:
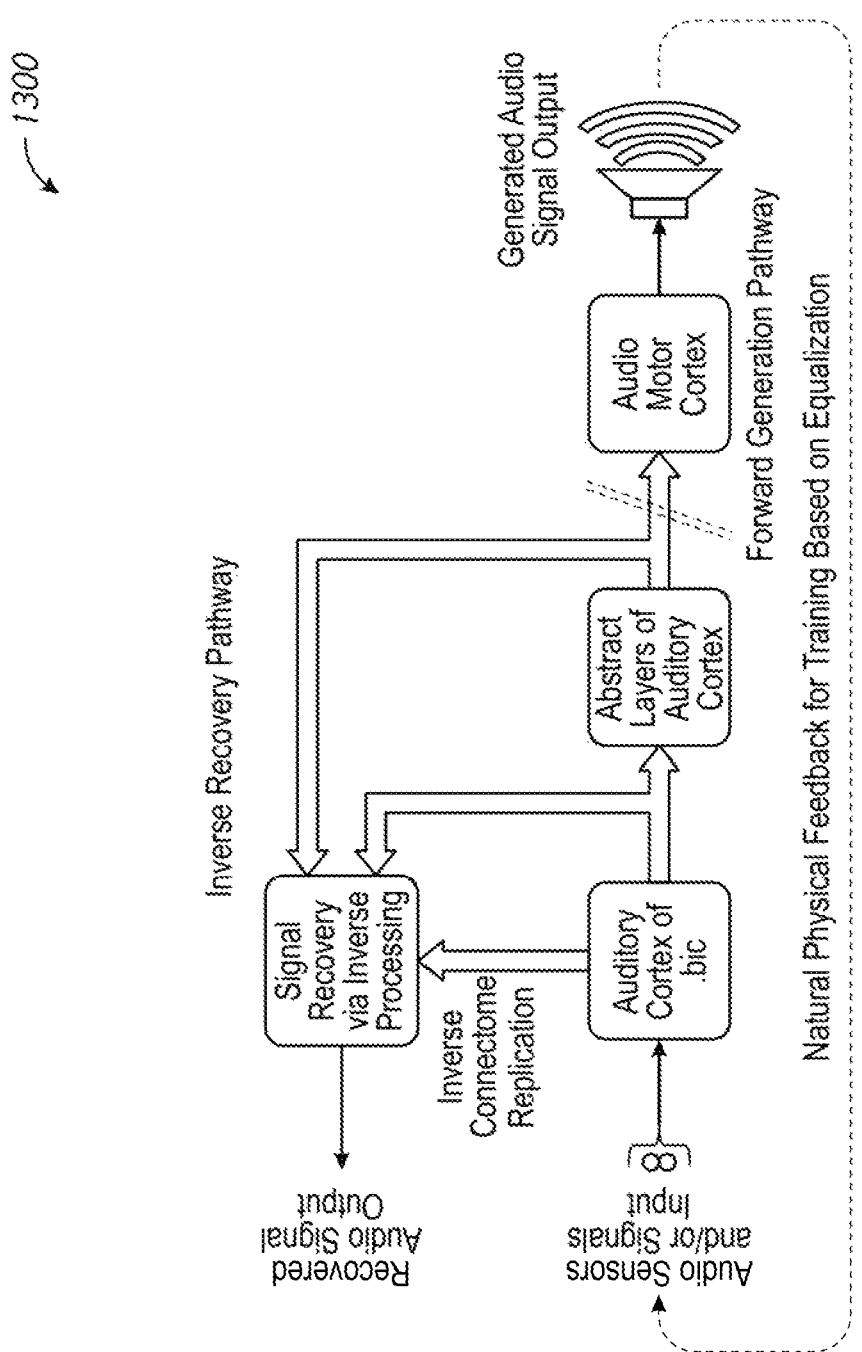
FIG. 13 is a schematic illustration of a system far auditory training arranged in accordance with examples described herein.

FIG. 13 is a schematic illustration of a system for auditory training arranged in accordance with examples described herein.

FIG. 13 generally illustrates two types of signal recovery for playback of encoded content. In a first type of signal recovery, index files that keep an order of cortex (e.g. auditory cortex) sequences back the visited ending nodes (leaves) mathematically via an inverse transformation of the morphologically developed cortex network. This may be an unnatural way and may be used for hi-fidelity signal recovery. For example, the encoded signals (e.g., index file) may be provided to an auditory cortex, then to abstract layers of the auditory cortex, and then signal recovery may be performed via inverse processing to yield a recovered audio signal output.

In a second method, another cortex may be used, which is trained for a generation of similar signals until the perceptual effect is equalized. Therefore, the motor cortex may first learn how to replicate the percepted signals towards the real physical feedback. When a triggering signal exists as a decision to speak via modulator inputs, the content that corresponds to the minimum energy dissipation external cycle may be generated via audio cortex as the second method of playback. The minimum energy dissipation external cycle refers to that when a decision is made by the fusion cortex (see FIG. 9) and a relevant action is taken by the motor cortex (see FIG. 9), the probability of the reply from the real world as ambient causes less energy stimulating inputs to biomimetic coding system as physical feedback from outside. For example, in the second method, audio input may be provided to the audio cortex, then to abstract layers of the audio cortex, then may be provided to an audio motor cortex for generation of an audio signal output in a forward generation pathway. The audio signal output may be used to equalize an input.

Equalization of the signals from auditory cortex when it is from the outside world and when it is generated by an audio motor cortex described herein may provide minimum energy dissipation training of an audio motor cortex m a manner of reinforced learning. Hence both using the mathematical inverse of the encoding function through the sensory cortex on digital computational platforms and regeneration of the signal through motor cortex on any kind of digital or non-digital system may provide playback of optimally encoded signals or information.

Examples of biomimetic codecs sod coding techniques described herein may be used m a variety of applications. For example, biomimetic codecs and coding techniques may be used for communication and/or data transfer in peer-to-peer communication, broadcast and/or multicast communication systems. For example, biomimetic codecs and coding techniques described herein may be used in cellular communications.

In some examples, encoders and encoding techniques described herein may be used to encode audio files (e.g., .wav files). An example of an encoding technique described herein may achieve, for example, encoded data which may have a size of 4.9% of the initial .wav file. An error rate associated with the encoding may vary from 0.65% using a trained coding network to just over 1% using an untrained network. In contrast, for example, .MP3 encoding of the same .wav file at 256 kbps may generate .MP3 file which is 36.3% of the size of the initial .wav file and may have an error rate of 0.13%. .MP3 encoding the same .wav file at 128 kbps may generate an .MP3 file which is 18.1% of the initial .wav file size and may have an error rate of 0.99%.

It may be desirable in a mobile device, for example, to have a codec that can provide consistent quality output for mixed speech and music content while optimizing performance for s combination of network, memory, CPU and energy availabilities. Efficient codecs may be asymmetric in terms of processing time of data—the encoding and decoding times may be different. Providing high efficiency compression in a more balanced manner may be beneficial for two-way communications. Latency and quality may be prominent in two-way voice and video communications. Perceptual quality and fidelity may be important factors when the data are stored or transferred in compressed form. Examples of biomimetic codecs described herein may provide unified speech and music coding technology which can provide improved quality for both speech and music content given the available network, memory, processing power, and energy resources.

Existing multimedia codecs do not support analytics based on the real time cross-correlation of multiple data resources (e.g. sound and relevant mood, type of music, instrument playing, word, place, context, person or object), and they accordingly require back conversion into raw data for analysis and classification. Hus process dramatically increases time complexity of the software that is used for real time monitoring and analysis. For example, video or image data need to be converted to bitmap raw data form first, so that analysis of MPEG4 or JPG data become possible. For this reason, multimedia data processing-based applications become unfeasible in many cases. Examples of biomimetic codecs described herein may facilitate relational analysis directly on compressed data. In compressed data described herein, h is possible, for example, for the music to include piano sound or the image to include a mountain in a sunny day, since these features are incorporated into data extraction such as finding the probable location from the video and audio in a mixed domain. Content identification from a short, randomly chosen part of a multimedia file, such as Shazam application, is a natural use of biomimetic codecs described herein, while this application may utilize a network connection in the existing systems. Another potent example is web searches; the detailed searches for object features may not be possible since the original picture has to be changed into bitmap first, with lower resolution, and then searched and processed; the image-only analytics, or video analytics, is too slow. Again, the raw dare need to be obtained or indexed first if the existing methods are used for transferring data. These processes require longer computational times and greater computational power. Examples of biomimetic codecs described herein may be used to search images for object features.

Another example is given in security systems. When 10,000 cameras are used for monitoring the city, the image or video data first may be converted into raw data from each camera, then searched for specific object feature within all the images, and then analyzed; this lengthy process may cause enormous delay in decision making in critical situations that require rapid response. Note that the detailed data are not transferred in abstract form, but in minute details, e.g., in high resolution, to bring about the salient features in the image. Then, a selective analysis is executed using the whole data, a process that is ineffective in terms of the enormous time mid power requirements. The same could be said in disaster cases, image taken, e.g., wife live video using drones flora the whole landscape and analyzed in detail while only a spatial location might only be critically essential for immediate action for the first responders. Examples of biomimetic codecs described herein may instead analyze features in a compressed etas stream without a need to transmit and/or store the raw image and/or video data.

Another example is use in mobile systems (e.g., cellular phones). Mobile systems may experience variable communication bandwidth conditions that may depend on changing network traffic loads and signal level variations, which may be addressed through dynamic adaptation and higher coding efficiency. Using conventional codec techniques, the service may become discontinuous, variable, or interrupted in many cases. Similarly, volatility may reduce the foil utilization rate of the network capacity. Examples of biomimetic codecs and encoding techniques described herein may be utilized with different computational powers and communication bandwidths without interruption by trading off the quality of the perceptual conversion.

Communication networks carry audio and video data at an increasing rate, which may consume most of their capacity. Existing codecs may not use asynchronous reference data to increase isochronous communication performance and utilization rate of the network capacity. Biomimetic codecs and coding techniques described hereto may support delivery of adapted and trained data templates (e.g., morphologically-adaptive coding networks) in an asynchronous way when network traffic is low, which may increase efficiency of the real time communication by isochronous communication based on asynchronous template data. This may be especially valuable for VOIP, on-demand video/audio, IP multicast, and/or IP broadcast applications.

Another example application is big data analytics. Big data analytic system may utilize parallelism for the distribution of computation into multiple hardware resources. Direct parallel processing for multimedia is usually either restricted or not possible when analytics are performed using existing codecs. Additional software may be needed to perform computations on multiple cores, CPUs, or computers. Depending on the content, these processes are costly and inefficient for achieving parallelism in many cases. Examples of biomimetic codecs and coding techniques described herein may facilitate distributed data processing and direct parallel processing that may increase the efficiency of the utilization rate of existing hardware resources.

Existing efficient codecs use complex mathematical functions such as Fourier or cosine transforms, which in turn may either increase the complexity of the systems operated or require additional hardware resources. Examples of biomimetic codecs and coding networks described herein may be optimised for operation on any of a wide variety of hardware, e.g., in GPU computing and/or FPGA processing.

Storage requirements linearly increase when existing codecs are used. For this reason, existing systems may use compressed data containers which are different from communication codecs for data that requite large volume. Therefore, the convergence is not possible with the existing systems; e.g., instead of one single device incorporating all the audio files, each file may be stored separately, increasing the storage requirement linearly, thereby increasing the real play-hack time significantly that uses the same amount of data. Examples of biomimetic codecs and coding techniques described herein may be convergent and may save storage space non-linearly that may be used for storing common templates (e.g., morphologically-adaptive coding networks). Therefore, the compression efficiency may increase when the data sire increases because of fire object-oriented characteristics of fire data storage and retrieval techniques described herein.

The particulars shown herein are by way of example and for purposes of illustrative discussion of the preferred embodiments of the present invention only and are presented in the cause of providing what is believed to be the most useful and readily understood description of fire principles and conceptual aspects of various embodiments of the invention. In this regard, no attempt is made to show structural details of the invention in more detail than is necessary for the fundamental understanding of fire invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular leans used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in fire sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of and examples for, the disclosure are described herein for illustrative purposes, various equivalent modifications are possible within the scope of the disclosure, as those skilled in the relevant art will recognize.

Specific dements of any foregoing embodiments can be combined or substituted for dements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals may be provided directly to and/or received directly from the recited components without intervening components, but also may be provided to and/or received from the certain components through intervening components.

What is claimed is:

1. A method comprising:
   providing input data;
   providing a morphologically-adaptive coding network comprising layers of nodes, the nodes each comprising a plurality of hillocks, the nodes each being created by decomposing test data into spectral components and linking a spectral distribution of the test data within a time constant of each node to a hillock among the plurality of hillocks as features, connections between selected nodes being provided at selected hillocks, the connections based on energy dissipation with respect to spectral component variation of the test data, at least a connection of the connections from each node to a new node being formed based on a new feature and an existing feature of the features; and
   encoding the input data using the morphologically-adaptive coding network to provide compressed data, the encoding comprising applying the input data to the morphologically-adaptive coding network to provide the compressed data comprising an identification of ending hillocks at last layers of the morphologically-adaptive coding network visited by the input data.

2. The method of claim 1, wherein the morphologically-adaptive coding network is trained to develop the layers of nodes by providing a next layer node at a selected hillock of a previous layer node, the selected hillock having stimulation rates above a threshold using a set of training data.

3. The method of claim 2, wherein the nodes each have an associated time constant, and wherein the next layer node has a smaller time constant than the previous layer node.

4. The method of claim 1, wherein applying the input data to the morphologically-adaptive coding network comprises applying a convolutional function to the input data.

5. The method of claim 4, wherein the convolutional function comprises a wavelet transform.

6. The method of claim 1, wherein ending nodes of the morphologically-adaptive coding network have an equal probabilistic frequency distribution.

7. The method of claim 1, wherein the compressed data is queryable.

8. The method of claim 1, wherein the compressed data further comprises an index of visited nodes of the morphologically-adaptive coding network.

9. The method of claim 1, wherein the input data comprises a type of data selected from audio (1D), image (2D), video (3D), other sensory patterns (XD) data, or combinations thereof.

10. The method of claim 9, wherein the morphologically-adaptive coding network is specific to the type of data.

11. The method of claim 1, wherein the morphologically-adaptive coding network comprises a first morphologically-adaptive coding network, and wherein the method further comprises encoding the compressed data using a second morphologically-adaptive coding network.

12. The method of claim 1, further comprising:
decoding the compressed data using the morphologically-adaptive coding network to recover an approximation of the input data.

13. The method of claim 1, further comprising filtering the input data applied to the morphologically-adaptive coding network using a low pass filter.

14. A device comprising:
at least one processor;
electronic storage encoded with a morphologically-adaptive coding network comprising layers of nodes, the nodes each comprising a plurality of hillocks, the nodes each being created by decomposing test data into spectral components and linking a spectral distribution of the test data within a time constant of each node to a hillock among the plurality of hillocks as features, connections between selected nodes being provided at selected hillocks, the connections based on energy dissipation with respect, to spectral component variation of the test data at least a connection of the connections from each node to a new node being formed based on a new feature and an existing feature of the features; and
at least one non-transitory computer readable medium encoded with instructions which, when executed, cause the device to perform actions comprising:
receive encoded input data comprising an identification of ending hillocks at last layers of the morphologically-adaptive coding network visited by input data; and
decode the encoded input data using the morphologically-adaptive coding network.

15. The device of claim 14, wherein the input data comprises audio data, the device comprises a speaker, and wherein the instructions further comprise instructions to cause the device to play the input data using the speaker after said decode.

16. The device of claim 14, wherein the input data comprises image data, the device comprises a display, and wherein the instructions further comprise instructions to cause the device to display the input data after said decode.

17. The device of claim 14, wherein the input data comprises video data, the device comprises a display, and wherein the instructions further comprise instructions to cause the device to display the video data after said decode.

18. The device of claim 14, wherein the morphologically-adaptive coding network comprises a first morphologically-adaptive coding network-, and wherein the electronic storage is configured to store a plurality of morphologically-adaptive coding networks, the instructions further comprising instructions which, when executed, cause the device to select the first morphologically-adaptive coding network for use based on a context of the input data.

19. The device of claim 14, wherein said decode action comprises performing a mathematical inverse of operations specified by the morphologically-adaptive coding network.

20. The device of claim 14, wherein said decode action comprises feedforward mimicking.

21. The method of claim 1, wherein at least a connection of the connections from each node to a new node is formed when a difference between the new feature and the existing feature of the features exceeds a threshold.

22. The method of claim 1, wherein the hillock is a randomly distributed hillock, and
wherein the connection of the connections from each node to the new node is formed at least in part by converting the randomly distributed hillock to the new node depending on distance and energy relations.

23. The device of claim 14, wherein at least a connection of the connections from each node to a new node is formed when a difference between the new feature and the existing feature of the features exceeds a threshold.

24. The device of claim 14, wherein the hillock is a randomly distributed hillock, and
wherein the connection of the connections from each node to the new node is formed at least in part by converting the randomly distributed hillock to the new node depending on distance and energy relations.

* * * * *